US006744910B1

(12) United States Patent
McClurg et al.

(10) Patent No.: US 6,744,910 B1
(45) Date of Patent: Jun. 1, 2004

(54) HAND-HELD FINGERPRINT SCANNER WITH ON-BOARD IMAGE NORMALIZATION DATA STORAGE

(75) Inventors: George William McClurg, Jensen Beach, FL (US); David Brunell, West Palm Beach, FL (US); Walter Guy Scott, North Palm Beach, FL (US)

(73) Assignee: Cross Match Technologies, Inc., West Palm Beach, FL (US)

( * ) Notice: Subject to any disclaimer, the term of this patent is extended or adjusted under 35 U.S.C. 154(b) by 0 days.

(21) Appl. No.: 09/430,296

(22) Filed: Oct. 29, 1999

Related U.S. Application Data
(60) Provisional application No. 60/140,754, filed on Aug. 19, 1999.

(51) Int. Cl.[7] .............................. G06K 9/00; G06K 9/40
(52) U.S. Cl. ...................... 382/124; 340/5.53; 382/274; 382/306; 348/241
(58) Field of Search ................................ 382/124–127, 382/274, 306; 340/5.53, 5.83, 5.52; 348/241, 248, 222.1; 358/504, 406, 463

(56) References Cited

U.S. PATENT DOCUMENTS

| 2,500,017 A | 3/1950 | Altman ........................... 88/57 |
| 3,200,701 A | 8/1965 | White ............................ 88/14 |
| 3,482,498 A | 12/1969 | Becker .......................... 95/12 |
| 3,527,535 A | 9/1970 | Monroe ........................ 356/71 |
| 3,617,120 A | 11/1971 | Roka ............................ 353/28 |
| 3,699,519 A | 10/1972 | Campbell ............. 340/146.3 E |
| 3,947,128 A | 3/1976 | Weinberger et al. .......... 356/71 |
| 3,968,476 A | 7/1976 | McMahon ............ 340/146.3 E |
| 4,032,975 A | 6/1977 | Malueg et al. |
| 4,063,226 A | 12/1977 | Kozma et al. ............... 365/125 |
| 4,210,899 A | 7/1980 | Swonger et al. ....... 340/146.3 E |
| 4,414,684 A | 11/1983 | Blonder .......................... 382/4 |
| 4,537,484 A | 8/1985 | Fowler et al. ................. 354/62 |
| 4,544,267 A | 10/1985 | Schiller ........................ 356/71 |
| 4,601,195 A | 7/1986 | Garritano ........................ 73/60 |
| 4,681,435 A | 7/1987 | Kubota et al. ................. 356/71 |
| 4,783,823 A | 11/1988 | Tasaki et al. .................... 382/4 |

(List continued on next page.)

FOREIGN PATENT DOCUMENTS

| EP | 0 101 772 A1 | 3/1984 | ............ G07C/9/00 |
| EP | 0 308 162 A2 | 3/1989 | ............ A61B/5/10 |

(List continued on next page.)

OTHER PUBLICATIONS

Btt (Biometric Technology Today), Finger technologies contacts, 2 pages.
Drake, M.D. et al., "Waveguide hologram fingerprint entry device," *Optical Engineering*, vol. 35, No. 9, Sep. 1996, pp. 2499–2502.
Roethenbaugh, G. (eds.), *Biometrics Explained*, 1998, ICSA, pp. 1–34.

(List continued on next page.)

*Primary Examiner*—Jayanti K. Patel
*Assistant Examiner*—Aaron Carter
(74) *Attorney, Agent, or Firm*—Sterne, Kessler, Goldstein & Fox, P.L.L.C.

(57) ABSTRACT

A hand-held fingerprint scanner having local storage of image normalization data is disclosed, as well as a method of manufacturing such a scanner. The image normalization data is representative of fixed pattern noise associated with the image sensor used in the fingerprint scanner. This data may be combined with the raw image data resulting in normalized image data. The image normalization data is stored in non-volatile memory where it can be transmitted to a host processor. Alternatively, the fingerprint scanner may include a normalization processor, allowing transmission of normalized fingerprint images to a host processor. Also disclosed is a fingerprint scanning system having remote fingerprint scanners with local storage of image normalization data.

37 Claims, 9 Drawing Sheets

U.S. PATENT DOCUMENTS

| | | | |
|---|---|---|---|
| 4,784,484 A | 11/1988 | Jensen | 356/71 |
| 4,792,226 A | 12/1988 | Fishbine et al. | 356/71 |
| 4,811,414 A | 3/1989 | Fishbine et al. | 382/52 |
| 4,876,726 A | 10/1989 | Capello et al. | 382/4 |
| 4,924,085 A | 5/1990 | Kato et al. | 250/227.28 |
| 4,933,976 A | 6/1990 | Fishbine et al. | 382/4 |
| 4,995,086 A | 2/1991 | Lilley et al. | 382/4 |
| 5,054,090 A | 10/1991 | Knight et al. | 382/4 |
| 5,067,162 A | 11/1991 | Driscoll, Jr. et al. | 382/5 |
| 5,067,749 A | 11/1991 | Land | 283/117 |
| 5,131,038 A | 7/1992 | Puhl et al. | 380/23 |
| 5,146,102 A | 9/1992 | Higuchi et al. | 250/556 |
| 5,157,497 A * | 10/1992 | Topper et al. | 235/380 |
| 5,187,747 A | 2/1993 | Capello et al. | 382/4 |
| 5,222,152 A | 6/1993 | Fishbine et al. | 382/2 |
| 5,230,025 A | 7/1993 | Fishbine et al. | 382/4 |
| 5,233,404 A | 8/1993 | Lougheed et al. | 356/71 |
| 5,249,370 A | 10/1993 | Stanger et al. | 34/22 |
| 5,285,293 A * | 2/1994 | Webb et al. | 348/241 |
| D348,445 S | 7/1994 | Fishbine et al. | D14/107 |
| D351,144 S | 10/1994 | Fishbine et al. | D14/107 |
| 5,384,621 A | 1/1995 | Hatch et al. | 355/204 |
| 5,412,463 A | 5/1995 | Sibbald et al. | 356/71 |
| 5,416,573 A | 5/1995 | Sartor, Jr. | 356/71 |
| 5,467,403 A | 11/1995 | Fishbine et al. | 382/116 |
| 5,469,506 A | 11/1995 | Berson et al. | 380/23 |
| 5,473,144 A | 12/1995 | Mathurin, Jr. | 235/380 |
| 5,509,083 A | 4/1996 | Abtahi et al. | 382/124 |
| 5,517,528 A | 5/1996 | Johnson | 375/259 |
| 5,528,355 A | 6/1996 | Maase et al. | 356/71 |
| 5,548,394 A | 8/1996 | Giles et al. | 356/71 |
| 5,591,949 A | 1/1997 | Bernstein | 235/380 |
| 5,596,454 A | 1/1997 | Hebert | 359/726 |
| 5,598,474 A | 1/1997 | Johnson | 380/23 |
| 5,613,014 A | 3/1997 | Eshera et al. | 382/124 |
| 5,615,277 A | 3/1997 | Hoffman | 382/115 |
| 5,625,448 A | 4/1997 | Ranalli et al. | 356/71 |
| 5,640,422 A | 6/1997 | Johnson | 375/259 |
| 5,649,128 A | 7/1997 | Hartley | 395/309 |
| 5,650,842 A | 7/1997 | Maase et al. | 356/71 |
| 5,661,451 A | 8/1997 | Pollag | 340/426 |
| 5,680,205 A | 10/1997 | Borza | 356/71 |
| 5,689,529 A | 11/1997 | Johnson | 375/259 |
| 5,717,777 A | 2/1998 | Wong et al. | 382/124 |
| 5,745,684 A | 4/1998 | Oskouy et al. | 395/200.8 |
| 5,748,766 A | 5/1998 | Maase et al. | 382/124 |
| 5,755,748 A | 5/1998 | Borza | 607/61 |
| 5,778,089 A | 7/1998 | Borza | 382/124 |
| 5,781,647 A | 7/1998 | Fishbine et al. | 382/1 |
| 5,793,218 A | 8/1998 | Oster et al. | 324/754 |
| 5,801,681 A * | 9/1998 | Sayag | 250/208.1 |
| 5,805,777 A | 9/1998 | Kuchta | 395/112 |
| 5,812,067 A | 9/1998 | Bergholz et al. | 340/825.31 |
| 5,815,252 A | 9/1998 | Price-Francis | 356/71 |
| 5,818,956 A | 10/1998 | Tuli | 382/126 |
| 5,822,445 A | 10/1998 | Wong | 382/127 |
| 5,825,005 A | 10/1998 | Behnke | 235/380 |
| 5,825,474 A | 10/1998 | Maase | 356/71 |
| 5,828,773 A | 10/1998 | Setlak et al. | 382/126 |
| 5,832,244 A | 11/1998 | Jolley et al. | 395/309 |
| 5,848,231 A | 12/1998 | Teitelbaum et al. | 395/186 |
| 5,855,433 A * | 1/1999 | Velho et al. | 194/207 |
| 5,859,420 A | 1/1999 | Borza | 250/208.1 |
| 5,862,247 A | 1/1999 | Fisun et al. | 382/116 |
| 5,867,802 A | 2/1999 | Borza | 701/35 |
| 5,869,822 A | 2/1999 | Meadows, II et al. | 235/380 |
| 5,872,834 A | 2/1999 | Teitelbaum | 379/93.03 |
| 5,900,993 A | 5/1999 | Betensky | 359/710 |
| 5,907,627 A | 5/1999 | Borza | 382/124 |
| 5,920,384 A | 7/1999 | Borza | 356/71 |
| 5,920,640 A | 7/1999 | Salatino et al. | 382/124 |
| 5,928,347 A | 7/1999 | Jones | 710/129 |
| 5,960,100 A | 9/1999 | Hargrove | 382/124 |
| 5,966,205 A * | 10/1999 | Jung et al. | 356/71 |
| 5,973,731 A | 10/1999 | Schwab | 348/161 |
| 5,974,162 A | 10/1999 | Metz et al. | 382/124 |
| 5,987,155 A | 11/1999 | Dunn et al. | 382/116 |
| 5,995,014 A | 11/1999 | DiMaria | 340/825.31 |
| 6,018,739 A | 1/2000 | McCoy et al. | 707/102 |
| 6,023,522 A | 2/2000 | Draganoff et al. | 382/124 |
| 6,041,372 A | 3/2000 | Hart et al. | 710/62 |
| 6,064,398 A * | 5/2000 | Ellenby et al. | 345/633 |
| 6,075,876 A | 6/2000 | Draganoff | 382/124 |
| 6,078,265 A | 6/2000 | Bonder et al. | 340/825.31 |
| 6,088,585 A | 7/2000 | Schmitt et al. | 455/411 |
| 6,104,809 A | 8/2000 | Berson et al. | 380/23 |
| 6,144,408 A * | 11/2000 | MacLean | 348/241 |
| 6,172,772 B1 * | 1/2001 | Steinle et al. | 358/406 |
| 6,240,200 B1 * | 5/2001 | Wendt et al. | 382/127 |
| 6,337,712 B1 * | 1/2002 | Shiota et al. | 348/231.1 |
| 6,658,164 B1 * | 12/2003 | Irving et al. | 382/274 |

FOREIGN PATENT DOCUMENTS

| | | | |
|---|---|---|---|
| EP | 0 379 333 A1 | 7/1990 | G07F/7/10 |
| EP | 0 623 890 A2 | 11/1994 | G06K/9/38 |
| EP | 0 653 882 A1 | 5/1995 | |
| EP | 0 379 333 B1 | 7/1995 | G07F/7/10 |
| EP | 0 889 432 A2 | 1/1999 | G06K/9/00 |
| EP | 0 905 646 A1 | 3/1999 | G06K/11/18 |
| EP | 0 924 656 | 6/1999 | |
| GB | 2 089 545 A | 6/1982 | G06K/9/20 |
| GB | 2313441 | 11/1997 | |
| JP | 11 225 272 | 8/1999 | |
| JP | 11 289 421 | 10/1999 | |
| WO | WO 87/02491 | 4/1987 | G07C/9/00 |
| WO | WO 90/03620 | 4/1990 | G06K/9/20 |
| WO | WO 92/11608 | 7/1992 | G06K/9/00 |
| WO | WO 94/22371 | 10/1994 | A61B/5/117 |
| WO | WO 96/17480 | 6/1996 | H04N/13/93 |
| WO | WO 97/29477 | 8/1997 | G09G/5/08 |
| WO | WO 97/41528 | 11/1997 | G06K/9/00 |
| WO | WO 98/09246 | 3/1998 | G06K/9/00 |
| WO | WO 98/12670 | 3/1998 | G07C/9/00 |
| WO | WO 99/12123 | 3/1999 | G06K/9/00 |
| WO | WO 99/26187 | 5/1999 | G06K/9/00 |
| WO | WO 99/40535 | 8/1999 | G06K/9/00 |

OTHER PUBLICATIONS

Automated Identification Systems (visited May 20, 1999) <http://www.trw.com/idsystems/bldgaccess2.html>, 1 page, Copyright 1999.

Ultra–Scan Corporation Home Page (visited May 29, 1999) <http://www.ultra–scan.com/index.htm>, 3 pages. (discusses technology as early as 1996).

Profile (last updated Aug. 16, 1998) <http://www.dermalog.de/Britain/Profile/profile.htm>, 3 pages. (discusses technology as early as 1990).

ID–Card System Technical Specifications (last updated Jul. 18, 1998) <http://dermalog.de/Britain/Products/ID–Card/idcard2.html>, 2 pages.

*Fujitsu Limited Products and Services* (updated Apr. 21, 1999) <http://www.fujitsu.co.jp/hypertext/Products/index–e.html>, 3 pages, Copyright 1995–1999.

SonyDCam (visited May 20, 1999) <http://www.microsoft.com/DDK/ddkdocs/Win2k/sonydcam.htm>, 3 pages,, Copyright 1999.

World Fingerprint Verification (visited May 17, 1999) <http://www.tssi,co.uk/products/finger.html>, 2 pages.

Startek's Fingerprint Verification Products: Fingerguard FG–40 (visited May 18, 1999) <http://www.startek.com.tw/product/fg40.html>, 3 pages.

SAC Technologies Showcases Stand–Alone SAC–Remote(TM) (visited May 18, 1999) <http://www.pathfinder.com/money/latest/press/PW/1998Mar25/1926.html>, 2 pages.

"Biometrics, The Future Is Now," www.securitymagazine.com, May 1999, pp. 25–26.

Mytec Technologies Gateway, (visited Apr. 27, 1999) <http://www.mytec.com/Products/gateway/>, 1 page.

Mytec Technologies Gateway: Features & Benefits, (visited Apr. 27, 1999) <http://www.mytec.com/Products/gateway/features.htm>, 1 page.

Mytec Technologies Touchstone Pro, (visited Apr. 27, 1999) <http://www.mytec.com/Products/Touchstone/>, 1 page.

Mytec Technologies Touchstone Pro: Features, (visited Apr. 27, 1999). <http://www.mytec.com/Products/Touchstone/features.htm>, 1 page.

Electronic Timeclock Systems and Biometric Readers (last updated Apr. 17, 1999) <http://www.lfs–hr–bene.com/tclocks.html>, 1 page.

Fingerprint Time Clock (visited May 17, 1999) <http://www.lfs–hr–bene.com/Biometrics/Fingerprintclock.html>, 6 pages.

KC–901: The KSI fingerprint sensor (visited May 17, 1999) <http://www.kinetic.bc.ca/kc–901.html>, 3 pages.

Intelnet Inc. (visited May 20, 1999) <http://www.intelgate.com/index.html>, 1 page, Copyright 1996.

Ver–i–Fus Fingerprint Access Control System (visited May 20, 1999) <http://www.intelgate.com/verifus.htm>, 2 pages. (Ver–i–fus product released in 1995).

Ver–i–fus® Configurations (visited May 20, 1999) <http://www.intelgate.com/verconfig.htm>, 1 page. (Ver–i–fus product released in 1995).

Ver–i–Fus® & Ver–i–Fus$^{mil®}$ (visited May 20, 1999) http://www.intelgate.com/vif_data.htm>, 3 pages. (Ver–i–fus product released in 1995).

Access Control System Configurations (visited May 20, 1999) <http://www.intelgate.com/access.htm>, 2 pages. (Ver–i–fus product released in 1995).

Company (visited May 17, 1999) <http://www.instainfo.com.company.htm>, 2 pages.

TouchLock™ II Fingerprint Identity Verification Terminal (visited May 17, 1999) <http://www.identix.com/TLock.htm>, 4 pages.

Physical Security and Staff Tracking Solutions (visited May 17, 1999) <http://www.identix.com/products/biosecurity.html>, 3 pages, Copyright 1996–1998.

Veriprint2000 Fingerprint Verification Terminal For Use With Jantek Time & Attendance Software (visited May 17, 1999) <http://www.hunterequipment.com/fingerprint.htm>, 2 pages.

Veriprint Product Applications (visited Apr. 27, 1999) <http://www.biometricid.com/uses.htm>, 1 page, Copyright 1999.

BII Home Page (visited Apr. 27, 1999) <http://www.biomemtricid.com/homepage.htm>, 1 page, Copyright 1999.

Veriprint 2100 Stand–Alone Fingerprint Verification Terminal (visited Apr. 27, 1999) <http://www.biometricid.com/veriprint2100.htm>, 3 pages.

Randall, N., "A Serial Bus on Speed," *PC Magazine,* May 25, 1999, pp. 201–203.

The DermaLog Check–ID (visited Nov. 12, 1999) <http://www.dermalog.de/ganzneu/products_check.html>, 1 page.

Check–ID Specifications and Features (visited Nov. 12, 1999). <http://www.dermalog.de/ganzneu/spec_check.html>, 1 page, Copyright 1999.

Startek's Fingerprint Verification Products: FingerFile 1050 (visited Oct. 8, 1999) <http://www.startek.com.tw/product/ff1050/ff1050.html>, 3 pages.

Time is Money! (visited Jun. 5, 1998) <http://www.iaus-.com/afim.htm>, 3 pages.

LS 1 LiveScan Booking Workstation High Performance Finger & Palm Scanning System (visited Jun. 4, 1998) <http://www.hbs–jena.com/ls1.htm>, 6 pages, Copyright 1998.

Welcome to the Homepage of Heimann Biometric Systems GMBH (visited Jun. 4, 1998) <http://www.hbs–jena.com/>, 1 page, Copyright 1998.

Heimann Biometric Systems Corporate Overview (visited Jun. 4, 1998) <http://www.hbs–jena.com/company.htm>, 4 pages, Copyright 1998.

Remote Access Positive IDentification—raPID (visited Jun. 3, 1998) <http://www.nec.com...>, 2 pages, Copyright 1997.

Morpho DigiScan Cellular (visited Jun. 3, 1998) <http://www.morpho.com/products/law_enforcement/digiscan/cellular.htm>, 2 pages, Copyright 1998.

A.F.I.S. (last updated Apr. 4, 1998) <http://www.dermalog.de/afis.htm>, 2 pages.

Morpho FlexScan Workstation (visited Jun. 3, 1998) <http://www.morpho.com/products/law_enforcement/flexscan/>, 2 pages, Copyright 1998.

True–ID® The LiveScan with special "ability". . . , 2 pages.

Printrak International: User List (visited Jun. 3, 1998) <http://www.printrakinternational.com and links>, 10 pages, Copyright 1996.

Live–Scan Prod ucts: Tenprinter® 1133S (visited Apr. 23, 1999) <http://www.digitalbiometrics.com/Products/tenprinter.htm>, 4 pages. (Tenprinter 1133s released in 1996).

TouchPrint™ 600 Live–Scan System (visited Apr. 23, 1999) <http://www.identix.com/products/livescan.htm>, 4 pages, Copyright 1996–1998.

Systems for Live–Scan Fingerprinting, Digital Biometricsw, Inc., 8 pages, Copyright 1998.

DBI FingerPrinter CMS, Digital Biometrics, Inc., 5 pages. (CMS released in 1998).

Fingerscan V20, Identix Incorporated, 1 page, Copyright 1999.

Verid Fingerprint Reader, TSSI, 4 pages.

Response to Request for Information, Cross Match Technologies, Inc., 12 pages, Apr. 14, 1999.

Startek's Fingerprint Verification Products (visited Nov. 17, 1999) <http://www.startek.com.tw/product/index.html>, 1 page.

Introduction to Startek's Fingerprint Verification Products (visited Nov. 17, 1999) http://www.startek.com.tw/product/index2.html>, 2 pages.

Automatic Fingerprint Identification Systems (visited Nov. 17, 1999) <http://www.sagem.com/en/produit4–en/empreinte–dig–en.htm>, 1 page.

Digital Biometrics Corporate Information (visited Nov. 17, 1999) <http://www.digitalbiometrics.com/Corporate₁₃ info/Corporate_info.htm>, 2 pages. (discusses technology as early as 1985).

DBI Live–Scan Products: Digital Biometrics TenPrinter (visited Nov. 17, 1999) <http://www.digitalbiometrics.com/products/tenprinter.htm>, 4 pages. (Tenprinter released in 1996).

DBI Live–Scan Products: Networking Options (visited Nov. 17, 1999) <http://www.digitalbiometrics.com/products/networking_options.htm>, 3 pages.

DBI Live–Scan Products: Digital Biometrics FingerPrinter CMS (visited Nov. 17, 1999) <http://www.digitalbiometrics.com/products/FingerPrinterCMS.htm>, 3 pages, (CMS released in 1998).

DBI Live–Scan Products: Image Printer Stations (visited Nov. 17, 1999) <http://www.digitalbiometrics.com/products/imageprinter.htm>, 2 pages.

DBI Live–Scan Products: FC–21 Fingerprint Capture Station (visited Nov. 17, 1999) <http://www.digitalbiometrics.com/products/Fingerprintcapture.htm>, 2 pages.

Series 400 OEM Scanner (visited Nov. 17, 1999) <http://www.ultra–scan.com/400.htm>, 3 pages (Scanner released in 1996).

USC Scanner Design (visited Nor. 17, 1999) <http://www.ultra–scan.com/scanner.htm>, 4 pages. (Scanner released in 1996).

Series 500/600 Scanners (visited Nov. 17, 1999) <http://www.ultra–scan.com/500.htm>, 3 pages (Scanner released in 1996).

Series 700 ID Station (visited Nov. 17, 1999) <http://www.ultra–scan.com/700.htm>, 3 pages. (Scanner released in 1998).

Identix: The Corporation (visited Nov. 17, 1999) <http://www.identix.com/corporate/home.htm>, 2 pages, Copyright 1996–1998.

Biometric Imaging Products (visited Nov. 17, 1999) <http://www.identix.com/products/bioimage.htm>, 1 page, Copyright 1996–1998.

TouchPrint™ 600 Live–Scan System (visited Nov. 17, 1999) <http://www.identix.com/products/livescan.htm>, 4 pages, Copyright 1996–1998.

TouchPrint™ 600 Palm Scanner (visited Nov. 17, 1999) <http://www.identix.com/products/palmscan.htm>, 3 pages, Copyright 1996–1998.

TouchPrint™ 600 Card Scan System (visited Nov. 17, 1999) <http://www.identix.com/products/cardscan.htm>, 3 pages, Copyright 1996–1998.

Dermalog Key—The safest and easiest way of access control (Last updated Jul. 18, 1997) <http://www.dermalog.de/Britain/Products/Key/key.htm>, 1 page.

Dermalog Finger–ID Your small size solution for high security (last updated Jul. 18, 1998) <http://www.dermalog.de/Britain/Products/Finger/fingerid.htm>, 1 page.

Mytec: Corporate (visited Nov. 17, 1999) <http://www.mytec.com/corporate/>, 2 pages.

Kinetic Sciences Inc. Fingerprint Biometrics Division (visited Nov. 17, 1999) <http://www.kinetic.bc.ca/main.FPB.html>, 1 page.

Fingerprint Biometrics: Securing the Next Generation, May 19, 1999, (visited Nov. 17, 1999) <http://www.secugen.com/pressrel.htm>, 2 pages.

Secugen Unveils Fully Functional Fingerprint Recognition Solutions, May 11, 1999, (visited Nov. 17, 1999) <http://www.secugen.com/pressrel.htm>, 3 pages.

POLLEX Technology Ltd., The Expert in Fingerprint Identification—POLLog (visited Nov. 17, 1999) <http://www.pollex.ch/english/products/pollog.htm>, 2 pages.

Sony Fingerprint Identification Terminal (visited Nov. 17, 1999) <http://www.isoftware.com/biosols/sony/fiu/application/fit100.htm>, 2 pages.

Sony Fingerprint Identification Unit (FIU–700) (visited Nov. 17, 1999) <http://www.isoftware.com/biosols/sony/fiu70/index.htm>, 2 pages. (Unit available late 1999).

Sony Fingerprint Identification Unit (visited Nov. 17, 1999) <http://www.isoftware.com/biosols/sony/fiu/index.htm>, 3 pages.

Fujitsu Fingerprint Recognition Device (FPI–550) (visited Nov. 17, 1999) <http://www.isoftware.com/biosols/fujitsu/fpi550.htm>, 2 pages.

Mitsubishi MyPass LI–1002 (visited Nov. 17, 1999) <http://www.iosoftware.com/biosols/mitsubishi/mypass.htm>, 2 pages.

SecureTouch PV—A Personal Password Vault (visited Nov. 17, 1999) <http://www.biometricaccess.com/securetouch_pv.htm>, 1 page.

Digital Descriptor Systems, Inc.—Profile (visited Nov. 17, 1999) <http://www.ddsi–cpc.com/pages/profile.html>, 3 pages.

Press Release: Printrak International Announces New Portable Fingerprint ID Solution, Dec. 19, 1996, (visited Nov. 17, 1999) <http://www.scott.net/~dg/25.htm>, 3 pages.

Corporate Profile (visited Nov. 17, 1999) <http://www.printrakinternational.com/corporate.htm>, 1 page.

Printrak Products (visited Nov. 17, 1999) <http://www.printrakinternational.com/Products.htm>, 1 page. (Discusses technology as early as 1974).

European Patent Office, Patent Abstract of Japan, Publication No. 11252489, Sep. 17, 1999, one page.

Verifier™ 200 Fingerprint Capture Devices, Cross Match Technologies, Inc., 2 pages, 1996–1997.

Verifier 200 Direct Fingerprint Reader, Cross Check Corporation, 2 pages, 1996–1997.

Verifier™ 250 Fingerprint Capture Devices, Cross Match Technologies, Inc., 2 pages, 1996–1997.

Verifier 250 Small Footprint Direct Fingerprint Reader, Cross Check Corporation, 2 pages, 1996–1997.

Verifier™ 290 Fingerprint Capture Devices, Cross Match Technologies, Inc., 2 pages, 1996–1997.

Verifier 290 Direct Rolled Fingerprint Reader, Cross Check Corporation, 2 pages, 1996–1997.

Verifier™ 500 Fingerprint Capture Devices, Cross Match Technologies, Inc., 2 pages, 1998.

Biometric terminal, 1 page.

10–Print Imaging System, Cross Check Corporation, 2 pages, 1998.

Cross Match Technologies, Inc. (visited Mar. 25, 1999) <http://www.crossmatch.net/>, 1 page.

Cross Match Technologies, Inc.—Products Overview (visited Mar. 25, 1999) <http://www.crossmatch.net/new/products/product–index.html>, 1 page.

Cross Match Technologies, Inc.—Law Enforcement Systems (visited Mar. 25, 1999) <http://www.crossmatch.net/new/law/law–index.html>, 2 pages.

Cross Match Technologies, Inc.—Commercial Systems: Building On The Standard (visited Mar. 25, 1999) <http://www.crossmatch.net/new/commercial/commercial-index.html>, 2 pages.

Cross Match Technologies, Inc.—International Sales (visited Mar. 25, 1999) <http://www.crossmatch.net/new/sales/sales-index.html, 1 page.

Cross Match Technologies, Inc.—Support (visited Mar. 25, 1999) <http://www.crossmatch.net/new/support/support-index.html>, 1 page.

Cross Match Technologies, Inc.—News—Press Releases—Verifier 400 Press Release (visited Mar. 25, 1999) <http://www.crossmatch.net/new/news/news-pr-050798.html>, 1 page.

Global Security Fingerscan™ System Overview (visited Jan. 11, 2000) <http://wwwu-net.com/mbp/sol/g/a9.htm>, 12 pages.

Sluijs F. et al.: "An on-chip USB-powered three-phase up/down DC/DC converter in a standard 3.3 V CMOS process" 2000 IEEE International Solid-State Circuits Conference. Digest of Technical Papers (Cat. No. 00CH37056), 2000 IEEE International Solid-State Circuits Conference. Digest of Technical Papers, San Francisco, CA, USA, Feb. 7-9, 2000, pp. 440–441, XP000923437 2000, Piscataway, NJ, USA, IEEE, USA ISBN: 0-7803-5853-8.

European Patent Office, Patent Abstract of Japan, Publication No. 10262071, Sep. 29, 1998, one page.

European Patent Office, Patent Abstract of Japan, Publication No. 11167630, Jun. 22, 1999, one page.

Automatic Translation of JP-A-11289421 (4 pages).

Automatic Translation of JP-A-11225272 (4 pages).

"Command Structure for a Low-Cost (Primitive) Film Scanner," *IBM Technical Disclosure Bulletin,* IBM Corp., vol. 35, No. 7, Dec. 1992, pp. 113–121.

Fingerprint Scan API Toolkit Version 1.x Feature List (Apr. 26, 2000) <http://www.mentalix.com/api/archive_fapiv-1.htm>, 3 pages.

"Image Acquisition System," *IBM Technical Disclosure Bulletin,* IBM Corp., vol. 29, No. 5, Oct. 1986, pp. 1928–1931.

Kunzman, Adam J. and Wetzel, Alan T., "1394 High Performance Serial Bus: The Digital Interface for ATV," *IEEE Transaction On Consumer Electronics,* IEEE, vol. 41, No. 3, Aug. 1995, pp. 893–900.

Mentalix Provides The First IAFIS-Certified Latent Print Scanning Solution for Windows (Jul. 23, 1999) <http://www.mentalix.com/pressreleases/fprintlook3_prel-.htm>, 2 pages.

Venot, A. et al., "Automated Comparison of Scintigraphic Images," *Journal of Nuclear Medicine,* vol. 27, No. 8, Aug. 1986, pp. 1337–1342.

EPO Patent Abstracts for Japanese Patent Publication No. 59-103474, published Jun. 14, 1984, 1 page.

EPO Patent Abstract for Japanese Patent Publication No. 10-079017, published Mar. 24, 1998, 1 page.

Ver-i-Fus® & Ver-i-Fus$^{mil®}$ (visited May 20, 1998) <http://www.intelgate.com/verconfig.htm>, 1 page. (Ver-i--fus product released in 1995).

* cited by examiner

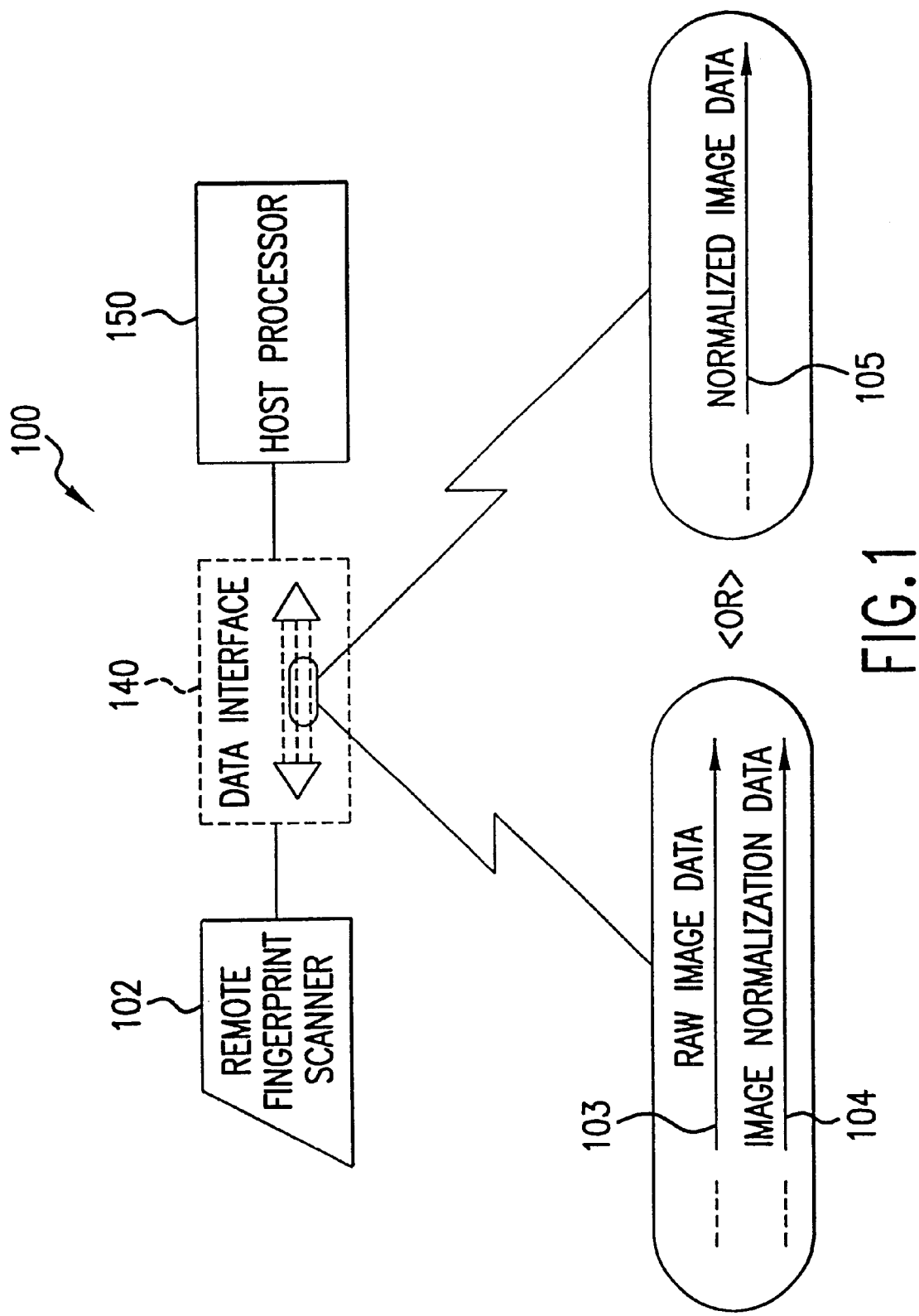

RAW FINGERPRINT IMAGE

NORMALIZED FINGERPRINT IMAGE

HAND-HELD FINGERPRINT SCANNER WITH ON-BOARD IMAGE NORMALIZATION DATA STORAGE

This application claims the benefit of the filing date of U.S. provisional application No. 60/140,754, filed Aug. 19, 1999 (incorporated by reference herein in its entirety).

BACKGROUND OF THE INVENTION

1. Field of the Invention

The present invention relates generally to fingerprint scanning and imaging.

2. Related Art

Biometrics are a group of technologies that provide a high level of security. Fingerprint capture and recognition is an important biometric technology. Law enforcement, banking, voting, and other industries increasingly rely upon fingerprints as a biometric to recognize or verify identity. See, *Biometrics Explained*, v. 2.0, G. Roethenbaugh, International Computer Society Assn. Carlisle, Pa. 1998, pages 1–34 (incorporated herein by reference in its entirety).

Fingerprint scanners having image sensors are available which capture an image of a fingerprint. A signal representative of the captured image is then sent over a data communication interface to a host computer for further processing. For example, the host can perform one-to-one or one-to-many fingerprint matching.

Due to manufacturing tolerances and techniques, image sensors can vary from chip-to-chip, column-to-column, row-to-row, or even from pixel-to-pixel within a given chip. For example, a particular column within an image sensor may have a greater, or lesser, sensitivity to light ("sensitivity offset") than the average sensitivity among the remaining columns. Since this sensitivity offset is particular to the image sensor itself, a column having an offset in a first image sensor may not have an offset in a second image sensor. As a result of sensitivity offsets, an image sensor excited with a uniform light source may exhibit non-uniform illumination among columns. This results in a non-uniform image. Furthermore, as a result of variances among image sensors, two image sensors excited by the same uniform light source may produce non-uniform images which differ from one another. This image distortion particular to the image sensor itself is referred to as fixed pattern noise ("FPN").

While low levels of FPN are sometimes acceptable in an image sensor within a fingerprint image scanner, this noise may be of a magnitude sufficient to degrade image quality to an unacceptable level. Furthermore, acceptable FPN levels may become unacceptable if, for example, the gain of the image sensor is increased to accommodate lower light levels.

It is therefore desirable to produce a fingerprint scanner having accurate image output despite the FPN associated with the particular image sensor used in the fingerprint scanner. Furthermore, since mobile use is increasingly desired in biometric applications, such as law enforcement, police and others need a portable hand-held device to easily and accurately capture fingerprint images in the field. It is therefore desirable to produce a mobile, hand-held fingerprint scanner having accurate output despite the FPN associated with the particular image sensor used in the fingerprint scanner.

SUMMARY OF THE INVENTION

The present invention provides a fingerprint scanner which includes image normalization data stored locally with the image sensor. Likewise, the present invention provides a fingerprint scanning system which includes remote fingerprint scanners having local storage of image normalization data. Such local storage of image normalization data is advantageous because it allows for interchangeability among remote scanners as well as between remote scanners and host processors.

In a first embodiment, a remote fingerprint scanner, which may be a mobile, hand-held unit, includes an image sensor and image normalization data. The image normalization data is stored in a non-volatile memory. The non-volatile memory is disposed locally with the image sensor. The image normalization data is specific to the image sensor and is representative of non-uniform sensitivity among pixels, columns of pixels, or rows of pixels within the image sensor. Additionally, the remote fingerprint scanner may include a data communications interface, such as a universal serial bus (USB) or an IEEE 1394 (also called FIREWIRE) compatible interface, that couples data between the remote fingerprint scanner and a docking station. Furthermore, the remote fingerprint scanner also may include a camera board on which are disposed the image sensor as well as the non-volatile memory. In the first embodiment, the output of the remote fingerprint scanner includes both raw image data as well as the image normalization data. This allows for image normalization, and thus the elimination of fixed pattern noise, at the host processor rather than within the remote fingerprint scanner. Thus, in the first embodiment, the remote fingerprint scanner does not include a normalization processor.

In a second embodiment, a remote fingerprint scanner also includes a normalization processor. The normalization processor is preferably included in the remote fingerprint scanner's system controller. The normalization processor normalizes image output. Thus, a remote fingerprint scanner in the second embodiment outputs a normalized image. Alternatively, even with the normalization processor, the remote fingerprint sensor of the second embodiment may be configured so that its output includes raw image data together with image normalization data, like the output of the remote fingerprint scanner of the first embodiment.

In addition to the fingerprint scanners of the first and second embodiments, a fingerprint scanning system is provided. Such a system includes a host processor in addition to at least one fingerprint scanning unit corresponding to the first or second embodiments and may also include a docking station as well a data communications interface.

Also disclosed is a method of manufacturing a remote fingerprint scanner according to the first and second embodiments. The disclosed method includes the steps of exciting an image sensor with a light source determining a set of normalization coefficients. These normalization coefficients are then stored in a non-volatile memory. The non-volatile memory may be disposed locally with the image sensor. The light source used in the method may be a uniform light source. The intensity of the uniform light source may be adjusted so as to avoid saturation at either extreme of sensitivity of said image sensor.

The step of determining a set of normalization coefficients may further include determining an average image intensity of a predetermined area of pixels within the image sensor the image sensor. The predetermined area of pixels may be a plurality of columns within the image sensor.

Likewise, the step of determining a set of normalization coefficients may also include determining an average column intensity for each column within said image sensor.

Furthermore, comparing an average column intensity for each column to an average image intensity may also be included in the step of determining a set of normalization coefficients. Such a comparison resulting in a normalization coefficient for each column. Preferable equations used in the manufacturing method are also disclosed.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

FIG. 1 is a diagram of a remote fingerprint scanner together with a host processor according to the present invention.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

Terminology

Figure 2A:
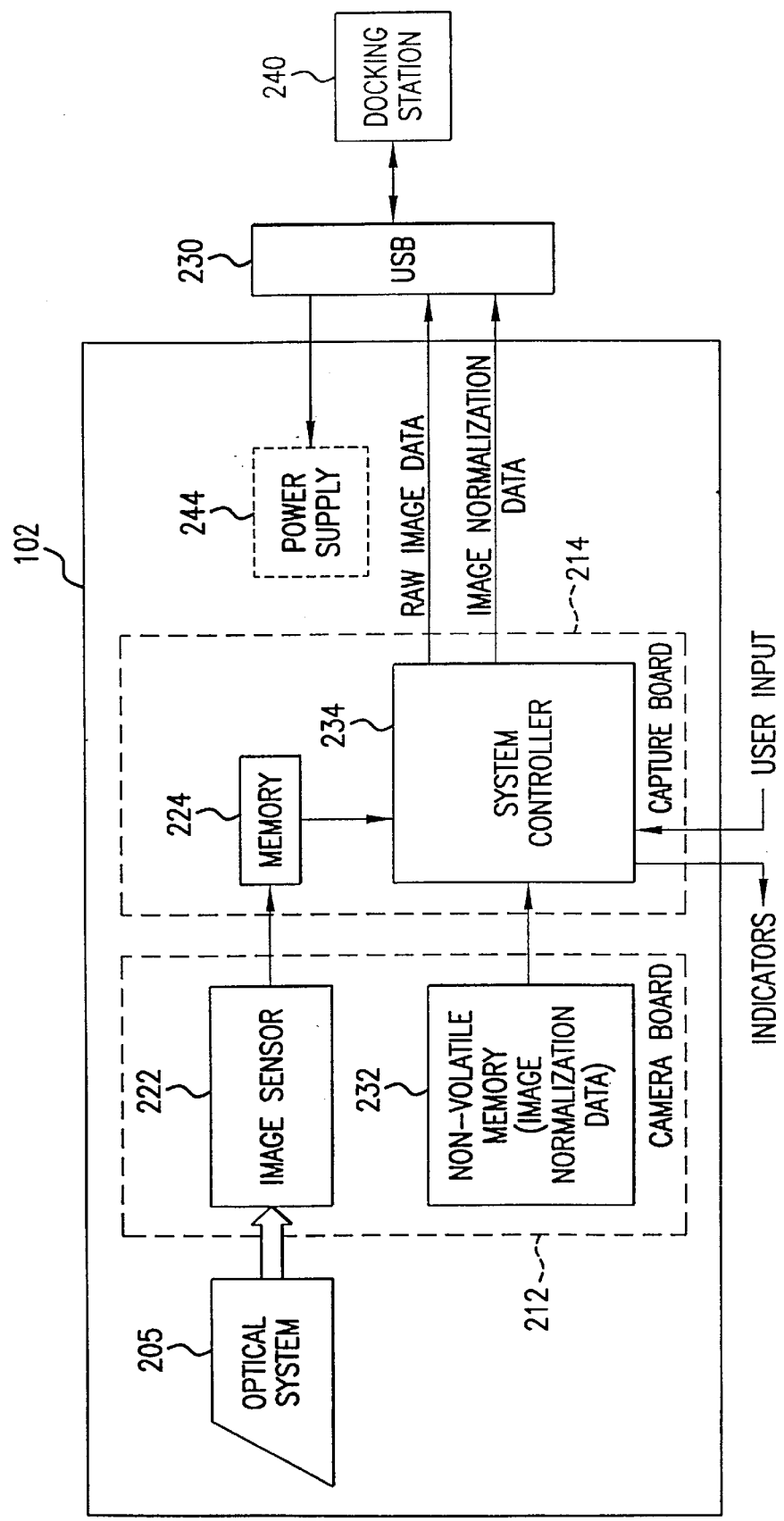
FIGS. 2A and 2B are diagrams of a fingerprint scanner according to the first and second embodiments of the present invention, respectively.

As used herein, the term "remote fingerprint scanner" is used to refer to a fingerprint scanner that scans a fingerprint and then transmits image data, normalized or raw, to a host processor. The term "remote" is meant to imply that the fingerprint scanning can take place at a location physically separate from the host processor. A remote fingerprint scanner and a host processor may be considered physically separate even though they may be connected through a data interface, permanent or otherwise.

As used herein, the term "host processor" is used to refer to any type of computer, processor(s), or logic which can receive and process fingerprint images detected by a remote fingerprint scanner. Such a processor may include software for performing one-to-one or one-to-many fingerprint matching and recognition or instead, for example in the case of a host processor used in a law enforcement vehicle, may be used to further transmit detected fingerprint image data to another processor for matching and recognition.

As used herein, the term "fingerprint image" is used to refer to any type of detected fingerprint including but not limited to an image of all or part of one or more fingerprints, a rolled fingerprint, a flat stationary fingerprint, a palm print, and/or prints of multiple fingers.

As used herein, the term "local storage of image normalization data" means that the image normalization data is disposed within the same remote fingerprint scanner as is the image sensor with which the normalization data is associated.

Fingerprint Scanner with Local Storage of Image Normalization Data

FIG. 1 is a diagram showing the arrangement of a remote fingerprint scanner together with a host processor according to the present invention. According to the present invention, a remote fingerprint scanner 102 is provided that includes local storage of image normalization data particular to the image sensor used in the remote fingerprint scanner. This local storage of image normalization data allows for transmission of raw fingerprint image data 103 together with image normalization data 104 to a host processor 150 through a data interface 140. Likewise, when an image normalization processor is included in the remote fingerprint scanner, transmission of a normalized fingerprint image 105 to a host processor is also possible.

FIG. 2A shows a remote fingerprint scanner 102 together with an exemplary data interface 140 according to a first embodiment of the present invention.

Optical system 205 can include a prism and a lens system as described in U.S. Pat. No. 5,900,933 (incorporated herein by reference). Other optical systems can be used in the present invention as would be apparent to a person skilled in the art.

Camera board 212 includes image sensor 222 and non-volatile memory 232. Any type of non-volatile memory may be used, for example an electrically-erasable read only memory (EEPROM) or an optically-erasable read only memory (Flash-EPROM), though the invention is not limited to these specific types of non-volatile memory. In one example, non-volatile memory 232 stores the executable code necessary for device operation, as well as image normalization data particular to the image sensor. Image sensor 222 includes a CMOS square pixel array. For example, a CMOS camera manufactured by Motorola Corporation can be used. The image sensor is discussed below in greater detail.

Capture board 214 includes memory 224 and system controller 234. Memory 224 is a random-access-memory for storing detected fingerprint images. Other types of memory (flash memory, floppy drives, disks, mini-floppy drives, etc.) may be used in alternative embodiments of the present invention. Furthermore, sufficient memory may be included to allow for the local storage of multiple fingerprint images. For example, captured images of fingerprints can be stored in mini-floppy drives (such as those available from Sandisk Corp. or Intel Corp.). In this way, multiple prints can be stored locally. This is especially important in border control, crime scene, and accident sight applications.

System controller 234, using the executable code stored in non-volatile memory 222, performs the necessary functions associated with device operation, such as image sensor control in response to user input.

As would be apparent to a person skilled in the art, other types of memory, circuitry and/or processing capability may be included on the capture board or within the system controller, examples of which include a frame grabber and an analog/digital converter.

Figure 4A:
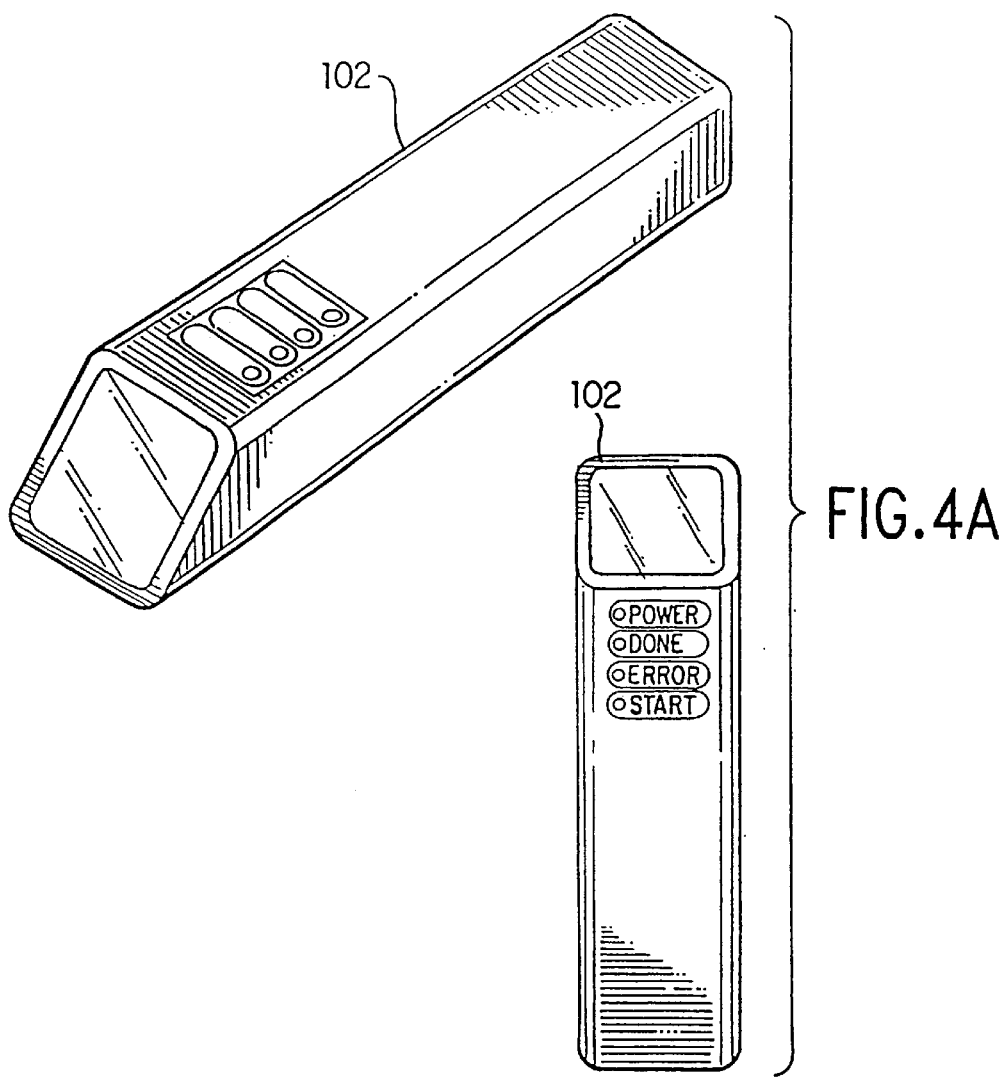
FIGS. 4A and 4B are drawings of an example implementation of a mobile, hand-held fingerprint scanner used in a law enforcement application according to the present invention.

Also included in the remote fingerprint scanner of the first embodiment shown in FIG. 2A is a power supply 244, a Universal Serial Bus (USB) interface, indicators, and user input controls (the latter two shown as indicators and buttons in FIG. 4A). While a USB interface is used in connection with the preferred embodiments, the invention is not limited to such an interface. For example, an IEEE 1394 High Performance Serial Bus interface, RF interface, or even a proprietary interface may be used without departing from the scope of the disclosed invention.

Returning to image sensor 222, due to manufacturing tolerances and techniques, the pixel arrays of such image sensors may vary in sensitivity from row-to-row, column-to-column, and even from pixel-to-pixel within a given array. This variance in sensitivity is referred to as "sensitivity offset." The image distortion which results from the sensitivity offset specific to a given image sensor is known as fixed-pattern-noise, or FPN. While FPN is frequently within tolerable ranges, there is a level of noise beyond which image quality is unacceptable. Furthermore, otherwise acceptable FPN levels may become unacceptable if, for example, the gain of the image sensor is increased to accommodate lower light levels. In order to correct for FPN, image normalization data particular to the pixel array may be produced.

Figure 5A:
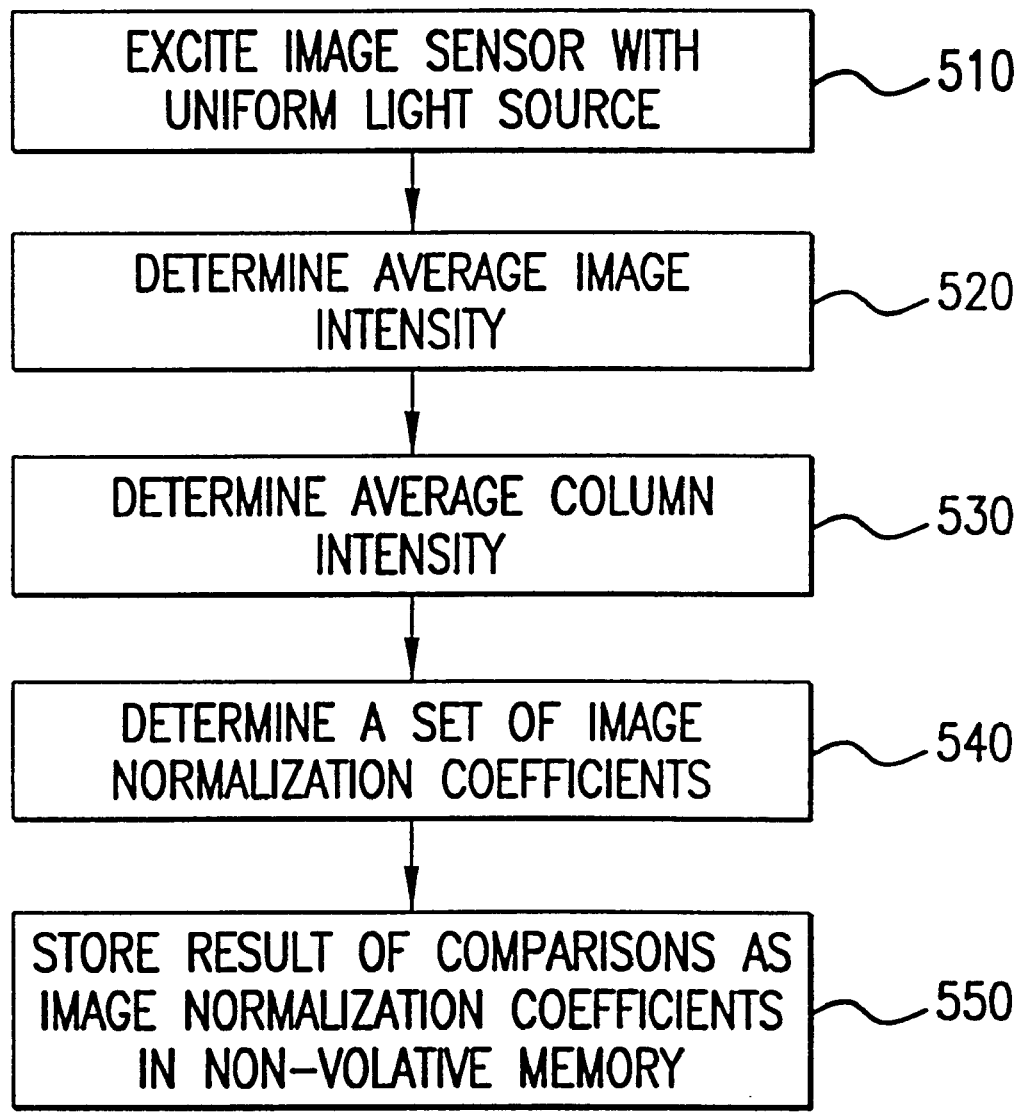
FIGS. 5A and 5B are flowcharts illustrating steps in a manufacturing method as well as in an image normalization process according to the present invention.

FIG. 5A is a flow-chart illustrating one example of an image normalization technique used in a method of manufacturing a remote fingerprint image scanner according to the present invention (steps 510–550). While a method of manufacturing a remote fingerprint scanner according to the present invention would necessarily include steps beyond those shown in FIG. 5A and discussed below (such as mounting the disclosed components on the respective boards, interconnecting the components, forming the housing, etc.), these steps are within the level of ordinary skill in the art and their specifics are not critical to the instant invention and so are not further discussed. Any additionally appropriate manufacturing techniques, steps, or processes may be performed without departing from the scope of the instant invention.

In the first step shown in FIG. 5A, the image sensor is excited with a light source (step 510). Preferably the light source used in step 510 is a uniform light source. The image received by the image sensor in response to this uniform light source is referred to herein as a "normalization image." When producing a normalization image, the intensity of the uniform light source may be adjusted to avoid saturation at either extreme of the sensitivity of the image sensor. For example, if the uniform light source is too bright, the normalization image may not include a range of values as a result of saturation. In this situation, the intensity of the uniform light source should be lowered so that the normalization image includes both positive and negative sensitivity offsets. An example of such a normalization image is shown in FIG. 3A.

Figure 3A:
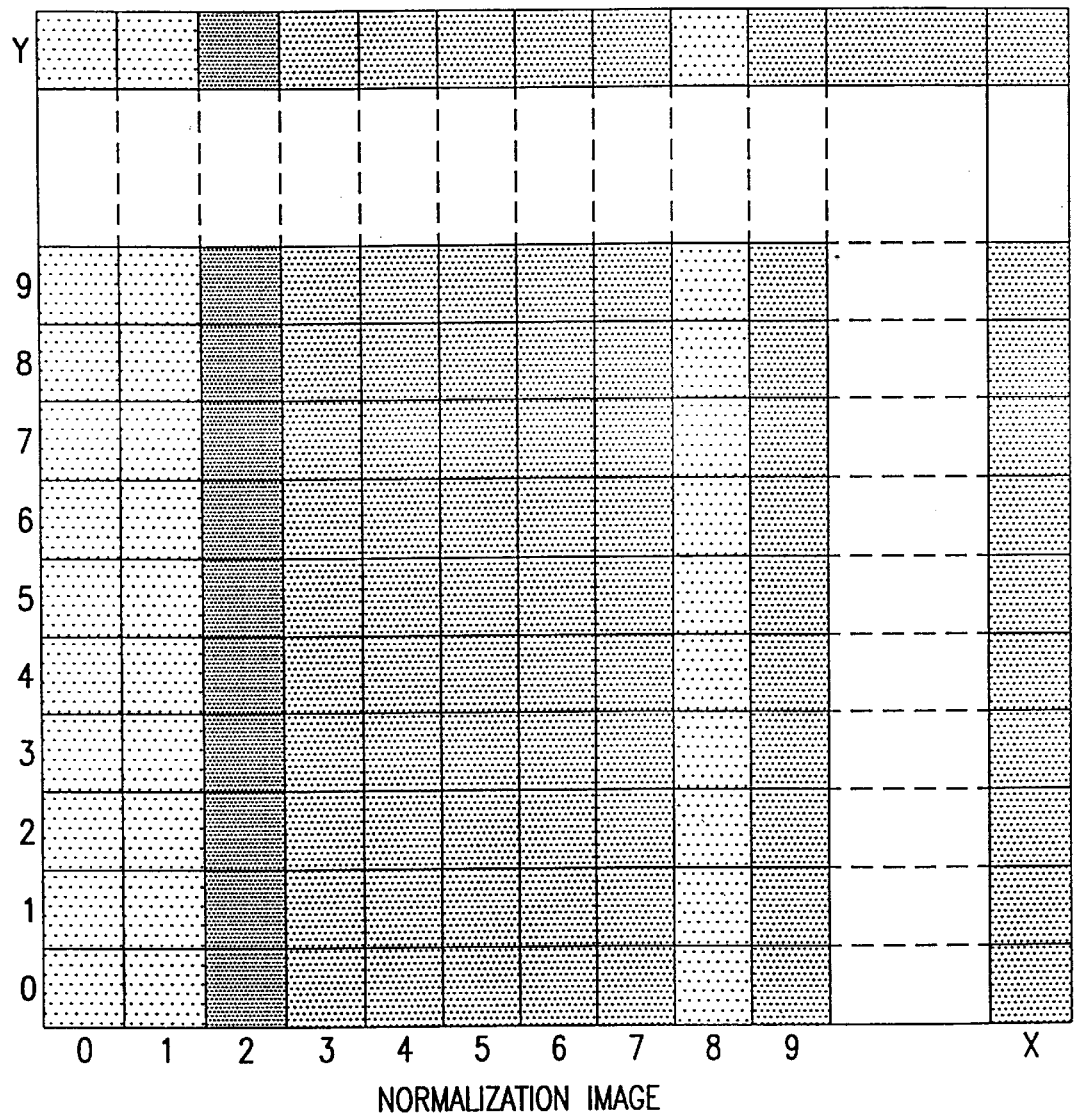
FIGS. 3A, 3B, and 3C are illustrations of a portion of a normalization image, a portion of a raw fingerprint image, and a portion of a normalized fingerprint image, respectively.

In FIG. 3A, the output of the image sensor is shown as a pixel array having columns 0-X and rows 0-Y. For the sake of clarity, only a small number of pixels included in the image sensor are depicted in the figures. The actual number pixels in the image sensor is not critical since the image size can be scaled up or down by the host processor, as desired. In the present example, the array may be a 640×480 array which can be scaled to 512×512, a size which conforms with software provided by the FBI. Furthermore, standard image size is 1"×1", 500 dpi, 256 levels of gray-scale (ANSI-NIST).

As can be seen from the normalization image of FIG. 3A, while most pixels responded evenly to the uniform light source, some columns of pixels demonstrated a sensitivity offset, resulting in a non-uniform image. While such an offset is also possible among rows or individual pixels, the most frequently encountered offset is among columns.

After a normalization image is produced, an average image sensitivity associated with the image sensor is determined (step 520). This average intensity can be determined with the following equation:

$$\text{AVERAGE IMAGE INTENSITY} = \frac{\sum_{col=0}^{x} \sum_{row=n}^{n'} \text{IMAGE(col, row)}}{(X+1) \times (n'-n+1)};$$

where X+1 is the total number of columns in said image sensor, and where n and n' are integers such that $0 \leq n < Y$ and $0 < n' \leq Y$ (where Y is the maximum row ordinate value in said image sensor), and such that n'−n+1 represents the number of rows within each column from which individual column intensity is determined. As can be seen from the above equation, the average image intensity is calculated by summing, column-by-column, the intensity within a number of rows within the column. Since the column itself will have a sensitivity offset, only a sample of rows from within each column need be summed. Five to ten rows within each column is generally sufficient, for example. Once the sum of the intensity of all included pixels is calculated, it is then divided by the total number of pixels included in the calculation. This results in an average image value.

While in this example all the columns in the array were used to arrive at an average image value, one skilled in the art given this description would recognize that such an average can also be determined through evaluation of only a subset of columns in the array. Of course, in certain applications, the number of columns used in the calculation is not large enough, sensitivity offsets among the averaged columns may skew the result of the average image intensity calculation. Thus, including all columns in the calculation is preferred.

In step 530, the average image intensity of each column is determined. The same normalization image used to calculate the average image intensity can be used. The average column intensity of a given column, x, can be determined with the following equation:

$$\text{AVERAGE COLUMN INTENSITY}(x) = \frac{\sum_{row=n}^{n'} \text{IMAGE}(x, \text{row})}{(n'-n+1)};$$

where AVERAGE COLUMN INTENSITY(x) equals the average image intensity for a particular column x, and where n and n' are integers such that $0 \leq n < Y$ and $0 < n' \leq Y$ (where Y is the maximum row ordinate value in said image sensor), such that n'−n+1 represents the number of rows within each column from which average column intensity is determined.

Next, a set of image normalization coefficients is determined (step 540). In one example, the average column intensity for each column is compared to the average image intensity for the image sensor. This comparison reveals the appropriate normalization coefficient for a particular column, and can be expressed by the following equation:

NORM(x)=AVERAGE IMAGE INTENSITY−AVERAGE COLUMN INTENSITY(x);

where NORM(x) is the image normalization coefficient for a particular column, x. Thus, repeating this comparison for each column yields a set of normalization coefficients sufficient to correct for sensitivity offsets among the columns of the image sensor.

Finally, the set of image normalization coefficients determined in step 540 are stored in non-volatile memory 232 for use during device operation (step 550).

While the steps and formulas discussed above and shown in FIG. 5A are described in terms of correcting sensitivity offsets among columns within an image sensor, one skilled in the art would readily understand that these steps and formulas may be easily modified so as to correct for sensitivity offsets among rows, groups of pixels, or even among individual pixels. Furthermore, while the process describes the calculation of all average column intensities followed by the calculation of the normalization coefficients, the normalization coefficients could also be calculated one column at a time.

Figure 2B:
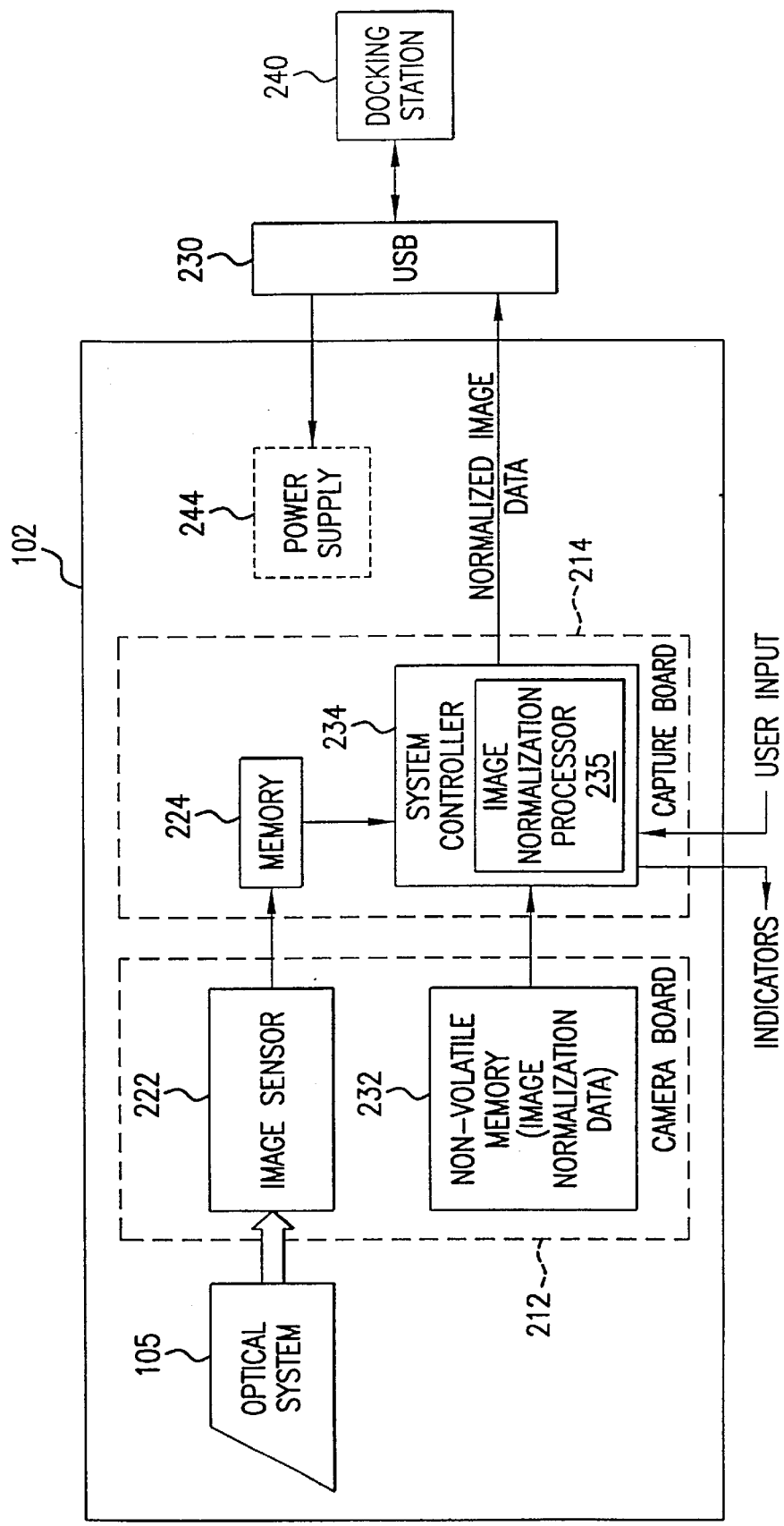

FIG. 2B illustrates a second embodiment of the disclosed invention. The second embodiment differs from the first embodiment of FIG. 2A only in that it further includes a normalization processor 235. Normalization processor 235 is preferably implemented as an additional function included in the remote fingerprint scanner's system controller 234. Normalization is the process whereby raw image data is combined with image normalization data producing normalized image data. This process can take place in normalization processor 235 as in the second embodiment, or can occur in host processor 150, using image normalization data supplied by the remote fingerprint scanner 102, as in the first embodiment. Image normalization is described further in terms of FIGS. 3A–3C, as well as FIG. 5B.

Figure 3B:
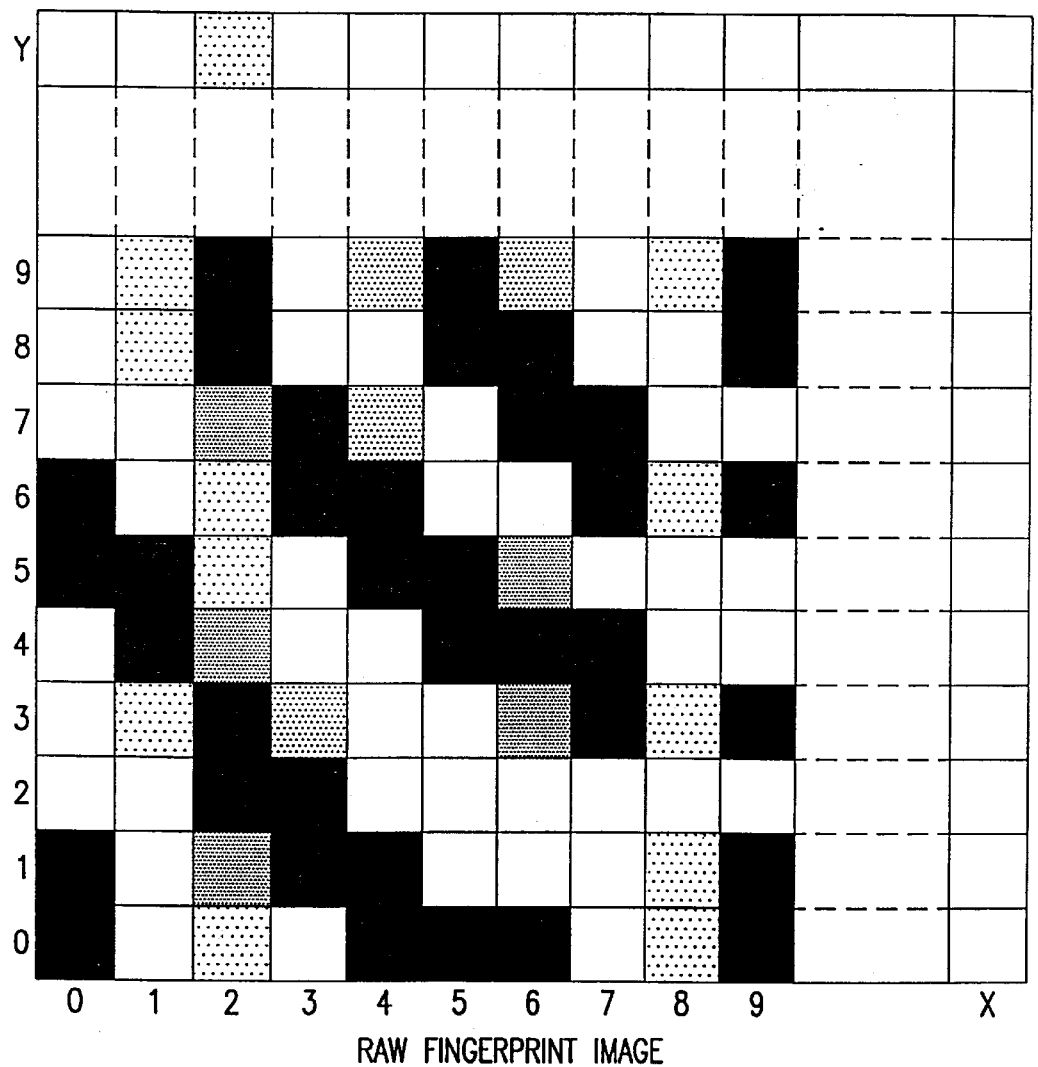
Figure 5B:
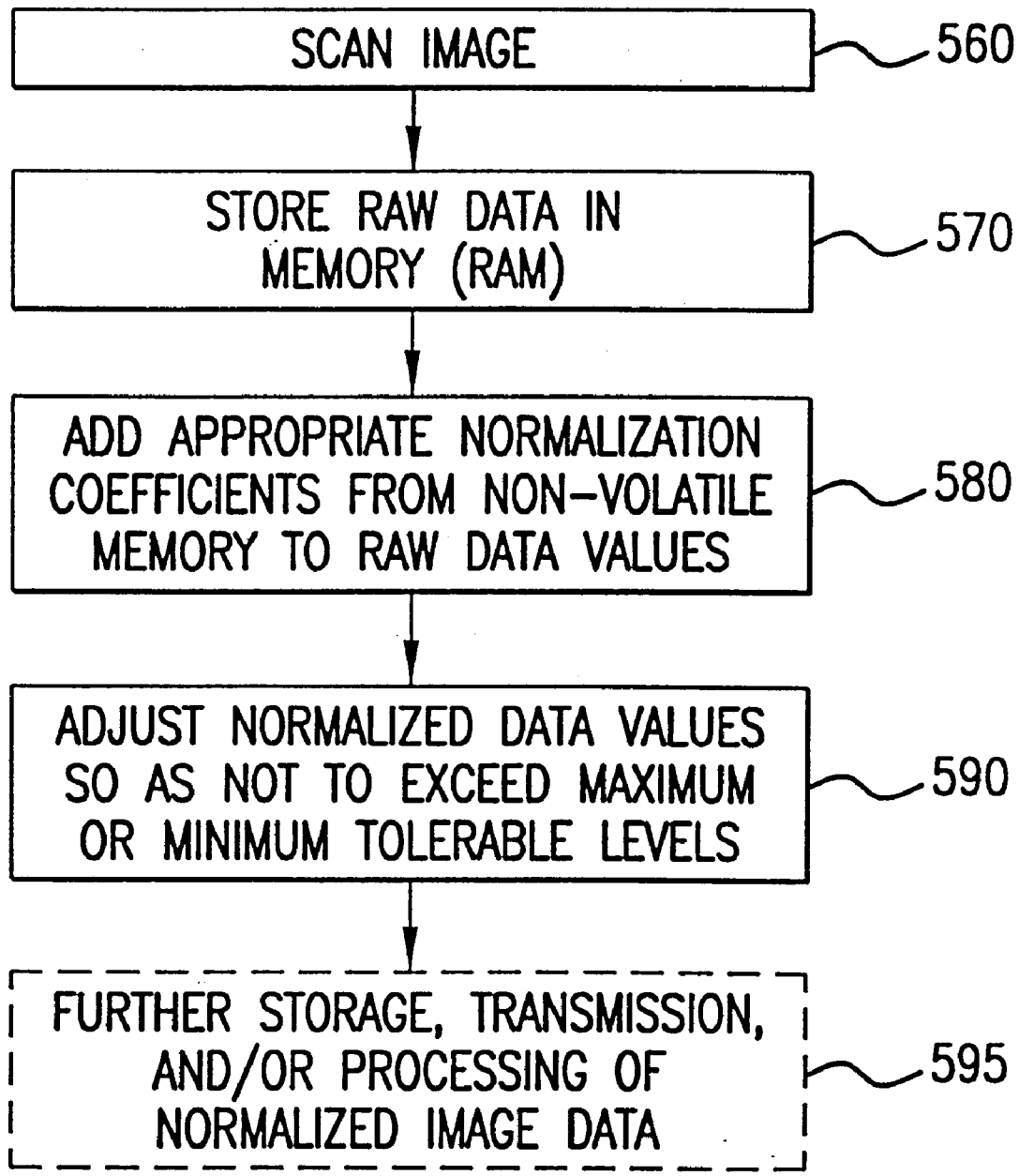

FIG. 5B is a flow chart illustrating the operational steps involved in image normalization during device operation (steps 560–595). During operation, a fingerprint is scanned (step 560) and the raw image data is stored in memory 224 (step 570). FIG. 3B shows a segment of an example of such an image. Since the image of FIG. 3B is raw, it includes the FPN illustrated in FIG. 3A. Thus, columns in FIG. 3B corresponding to those columns in FIG. 3A which demonstrate a sensitivity offset will appear lighter or darker than they should. In order to eliminate the FPN from the raw image data, the raw image data is combined with the image normalization data (step 580). This process can be described with the following equation:

NORMALIZED IMAGE[col, row]=RAW IMAGE[col, row]+ NORM[col];

where NORMALIZED IMAGE[col, row] is a single normalized pixel data value, RAW IMAGE[col, row] is a single raw image pixel value, and NORM[col] is the normalization coefficient for a particular column calculated in the manner discussed above in connection with FIG. 5A. Thus, the result of the image normalization process is a set of normalized image data which can then be stored, transmitted, and/or used in further processing (step 595).

In calculating normalized image data, care should be taken that the normalized image values do not exceed allowable limits. If the result of the above equation exceeds an allowable limit, the result should be set to the maximum, or minimum, allowable value, as appropriate (step 590). This situation can occur, for example, when a raw image data value represents a pixel near saturation in a column having normalization coefficient that, when added to the raw data value (during step 580), exceeds the allowable image value. In other words, a particular column may have a positive normalization coefficient because the pixels in that column have a sensitivity offset such that they appear lighter than they should. If, during operation, the sensor records a dark value for a pixel in that column, adding the normalization coefficient associated with that column with the particular pixel value may exceed the maximum value limit. Thus, normalized image data values should be set to maximum or minimum values whenever the result of image normalization exceeds maximum or minimum allowable values (step 590).

Figure 3C:
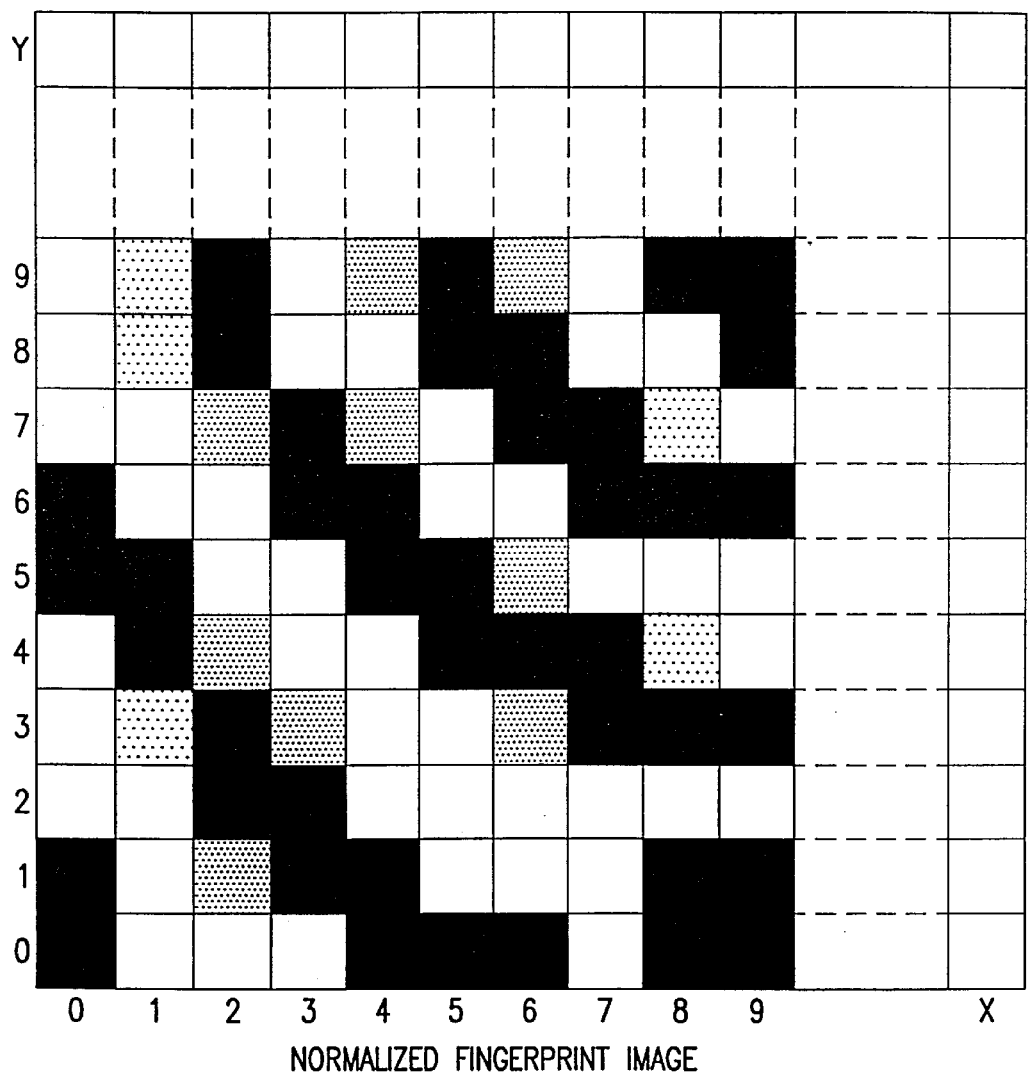

FIG. 3C illustrates a portion of a normalized image corresponding to the raw image of FIG. 3B. As can be seen be comparing the image of FIG. 3C with those of FIGS. 3A and 3B, FIG. 3C shows the result of correcting the image of FIG. 3B for the sensitivity offsets of the image sensor as demonstrated by FIG. 3A.

Because the remote fingerprint scanner of FIG. 2B includes a normalization processor in the system controller, output from the scanner can include normalized image data, while the output of the remote fingerprint scanner of FIG. 2A includes raw image data together with image normalization data. Thus, in the case of the remote fingerprint scanner of FIG. 2A, image normalization occurs in the host processor.

Example Implementation

Figure 4B:
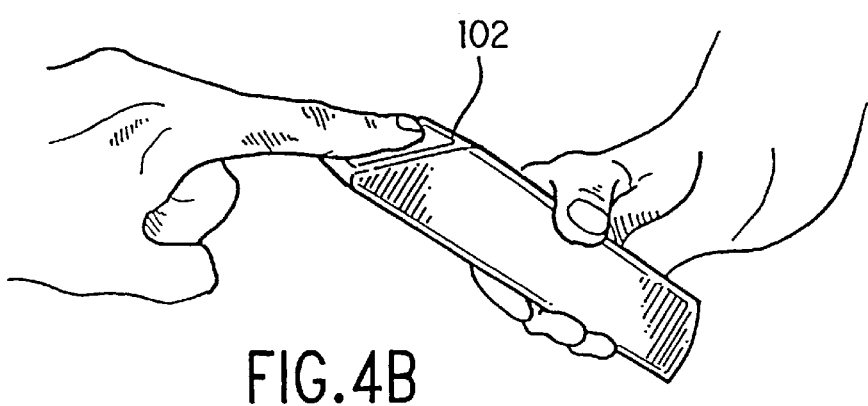

FIGS. 4A and 4B illustrate the outward appearance of a mobile, hand-held remote fingerprint scanner according to FIGS. 2A and 2B. Fingerprint scanner 102 is ergonomically designed to fit the hand naturally. The oblong, cylindrical shape (similar to a flashlight), does not contain sharp edges. The device is small enough to be gripped by large or small hands without awkward or unnatural movement. The device is comfortable to use without muscle strain on the operator or subject. In one example, fingerprint scanner 102 is 1.5×8.0×1.5 inches (height×length×width), weighs about 340 grams (12 oz.), and has an image platen size of about 1"×1".

Fingerprint scanner 102 has controls and status indicators on the front-face of the unit for single (left or right) hand operation. The non-intimidating appearance of the fingerprint scanner 102 is designed to resemble a typical flashlight—a device that is not generally threatening to the public. Fingerprint scanner 102 has no sharp edges and is constructed of a light-weight aluminum housing that is coated with a polymer to give the device a "rubberized" feel. Because fingerprint scanner 102 is small and lightweight, it may be carried on the officer's utility belt upon exiting a vehicle. The device is designed for one hand use, allowing the officer to have a free hand for protective actions. Fingerprint scanner 102 is designed for harsh environments to sustain issues such as dramatic temperature changes and non-intentional abuse.

Fingerprint scanner 102 contains a simple push button and set of 3 LED's that provide user activation and status indication. The user need only press one button to activate the unit. Once activated, the fingerprint scanner 102 awaits a finger to be introduced to the fingerprint capture platen. The digital image (or analog) is automatically captured when an adequate image area is detected. The image is then tested for quality of data prior to notifying the operator with an indication (e.g., visual indication and/or audible tone) for acceptance. The unit emits a tone to indicate a completed process. The officer may introduce the unit to a docking station (discussed below) blindly, maintaining his eyes on the subject for safety. Once seated in the docking station, the fingerprint is automatically transferred to the mobile computer without operator intervention. The detected image is scalable to conform to FBI provided software (cropped or padded to 512 pixels by 512 pixels), although the standard image size is 1"×1", 500 dpi, 256 levels of gray-scale (ANSI-NIST).

Fingerprint scanner 102 is held in either hand and used to capture a person's fingerprint. The fingerprint is captured from a cooperative individual (frontal approach) or an uncooperative individual (handcuffed subject—most commonly face down). Fingerprint scanner 102 can be operated with one-hand, allowing the officer to have a hand ready for protective actions. The officer need not have fingerprinting knowledge to capture the fingerprint.

The instant invention further includes a fingerprint scanning system. FIG. 1 shows a mobile, hand-held fingerprint scanner and docking system 100 according to the present invention. System 100 includes a mobile, hand-held fingerprint scanner 102, data interface 140 and a host processor 150. Fingerprint scanner 102 includes local storage of image normalization data. For example, fingerprint scanner 102 may be the fingerprint scanner shown in FIG. 2A or 2B, or a fingerprint scanning system may include both types of remote fingerprint scanners. Fingerprint scanner 102 is detachably coupled to docking station 140, as shown in FIGS. 2A and 2B. Stored images are then downloaded from fingerprint scanner 102 through docking station 140 to a host processor 150. In the case of a mobile, hand-held fingerprint scanner, for example as would be used by a law enforcement officer in the field, fingerprint scanner 102 communicates the fingerprint images together with normalization data (or normalized images if the fingerprint scanner includes a normalization processor) to a mobile host processor 150 in a vehicle.

Docking station 140 can hold fingerprint scanner 102 in a variety of configurations depending upon a particular application and environment. For example, in a law enforcement application, docking station 140 may be a holder mounted in a police car. The docking station 140 serves as a cradle that easily guides the fingerprint scanner 102 into position blindly, allowing the officer to focus on safety issues rather than the device operation. Docking station 140 is small and compact for easy placement in a tight space.

Host processor 150 can be any type of computer, processor(s), or logic which can receive and process fingerprint images detected by the fingerprint scanner 102. In one example, host processor 150 includes software for performing one-to-one or one-to-many fingerprint matching and recognition, while processing operations related to detecting, storing a detected image signal, and image normalization in the case of the remote fingerprint scanner of FIB. 2B, are carried out in capture board 214.

In another example, host processor 150 transmits detected fingerprint data to another processor for matching and recognition. For instance, if host processor 150 is in a law enforcement vehicle, host processor 150 can transmit detected fingerprint data to another processor at a police station or FBI office with access to a larger data base for matching and recognition over a broader range of data.

In a law enforcement application, host processor 150 can further assemble the detected images into a format compatible with a local, county, or state AFIS or the NCIC or NCIC 2000 service. National Crime Information Center (NCIC) is an on-line information service jointly maintained by the Federal Bureau of Investigation (FBI) and criminal justice agencies throughout the United States and its territories. NCIC is being replaced by NCIC 2000, which will provide all NCIC services and new services. The new services include fingerprint matching, additional information files, and image files.

Host processor 150 may include or may be coupled through a wireless communication link to other system data bases or services (such as NCIC 2000). A software interface which is TWAIN compliant is included for easy integration and Plug and Play (PnP) connectivity.

Remote fingerprint scanner 102 can be used with an FBI Mobile Imaging Unit (MIU) software application in host processor 150 to support NCIC 2000 functions in mobile law enforcement vehicles. The MIU provides a user interface, supports various peripheral devices, and transmits information in NCIC 2000-defined formats. The remote fingerprint scanner 102 can operate as a peripheral to the MIU (or to a processor that performs MIU-equivalent functions).

In an example environment, fingerprint scanner 102 can meet the following criteria:

A WINDOWS operating system environment and FBI-provided fingerprint image processing algorithms are used in NCIC 2000 fingerprint transactions;

Fingerprint image sampling rate: 500 pixels per inch

Size at input to FBI-provided Software: Cropped or padded to 512 pixels by 512 pixels Software interface from live scan device to MIU: TWAIN Image Quality: Electronic Fingerprint Transmission Specification, FBI Criminal Justice Information Services

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A remote fingerprint scanner comprising:

an image sensor; and image normalization data stored in a non-volatile memory, wherein said image normalization data is specific to the image sensor and is representative of image sensor sensitivity at a pixel level;

wherein the remote fingerprint scanner is capable of being detachably coupled with a docking station that is coupled to a host processor;

wherein said image sensor is capable of detecting at least one fingerprint image when the remote fingerprint scanner is not coupled with the docking station; and wherein said image normalization data and fingerprint image data corresponding to said at least one fingerprint image are transmitted to the host processor through the docking station when the remote fingerprint scanner is detachably coupled with the docking station.

2. The remote fingerprint scanner of claim 1, wherein said fingerprint scanner is a mobile, hand-held fingerprint scanner.

3. The remote fingerprint scanner of claim 1, further comprising:

a data communications interface that couples said fingerprint image data and said image normalization data between the remote fingerprint scanner and the docking station.

4. The remote fingerprint scanner of claim 3, wherein said data communications interface is selected from the group consisting of a universal serial bus (USB) and an IEEE 1394 compatible interface.

5. The remote fingerprint scanner of claim 1, further comprising:
a camera board;
wherein said image sensor and said non-volatile memory are disposed on said camera board.

6. The remote fingerprint scanner of claim 1, wherein said image normalization data is representative of non-uniform sensitivity among pixels, rows of pixels, or columns of pixels within said image sensor.

7. The remote fingerprint scanner of claim 6, wherein said image normalization data is representative of non-uniform sensitivity among columns of pixels within said image sensor, said image normalization data comprising an image normalization coefficient for each column within said image sensor, wherein an image normalization coefficient for a particular column, x, within said sensor is defined according to the following equation:

$$NORM(x) = AVERAGE\ IMAGE\ INTENSITY - AVERAGE\ COLUMN\ INTENSITY(x);$$

where:

NORM(x) is the image normalization coefficient for a particular column, x;

AVERAGE IMAGE INTENSITY is defined according to the following equation:

$$AVERAGE\ IMAGE\ INTENSITY = \frac{\sum_{col=0}^{x} \sum_{row=n}^{n'} IMAGE(col, row)}{(X+1) \times (n'-n+1)};$$

where X+1 is the total number of columns in said image sensor, and where n and n' are integers such that $0 \leq n < Y$ and $0 < n' \leq Y$ (where Y is the maximum row ordinate value in said image sensor), such that n'−n+1 represents the number of rows within each column from which individual column intensity is determined; and where AVERAGE COLUMN INTENSITY(x) is the average intensity for a particular column, x, within said image sensor and is defined by the following equation:

$$AVERAGE\ COLUMN\ INTENSITY(x) = \frac{\sum_{row=n}^{n'} IMAGE(x, row)}{(n'-n+1)};$$

where n and n' are integers such that $0 \leq n < Y$ and $0 < n' \leq Y$ (where Y is the maximum row ordinate value in said image sensor), such that n'−n+1 represents the number of rows within each column from which average column intensity is determined.

8. The mobile, hand-held fingerprint scanner of claim 1, further comprising:
a normalization processor that, with said image normalization data, normalizes raw image data from said image sensor.

9. A fingerprint scanning system comprising:
at least one remote fingerprint scanner, each said at least one remote fingerprint scanner including:
an image sensor, and
image normalization data stored in a non-volatile memory, wherein said image normalization data is specific to the image sensor and is representative of image sensor sensitivity at a pixel level;
at least one host processor; and
a docking station corresponding to each said at least one host processor;
wherein said image sensor of a first remote fingerprint scanner is capable of detecting at least one fingerprint image when said first remote fingerprint scanner is not coupled with any docking station; and
wherein a first host processor receives data from said first remote fingerprint scanner when said first remote fingerprint scanner is detachably coupled to a docking station corresponding to said first host processor.

10. The fingerprint scanning system of claim 9, wherein each said at least one remote fingerprint scanner is a mobile, hand-held fingerprint scanner.

11. The fingerprint scanning system of claim 9, wherein each said at least one remote fingerprint scanner further includes a data communications interface;
wherein said data communications interface of said first remote fingerprint scanner couples data between said first remote fingerprint scanner and a first docking station when said first remote fingerprint scanner is coupled to said first docking station.

12. The fingerprint scanning system of claim 11, wherein each said data communications interface is selected from the group consisting of a universal serial bus (USB) and an IEEE1394 compatible interface.

13. The remote fingerprint scanning system of claim 9, wherein each said at least one remote fingerprint scanner further comprises:
a camera board;
wherein said image sensor and said non-volatile memory are disposed on said camera board.

14. The remote fingerprint scanning system as in claim 9, wherein said image normalization data is representative of non-uniform sensitivity among pixels, rows of pixels, or columns of pixels within said image sensor.

15. The remote fingerprint scanner of claim 14, wherein said image normalization data is representative of non-uniform sensitivity among columns of pixels within said image sensor, said image normalization data comprising an image normalization coefficient for each column within said image sensor, wherein an image normalization coefficient for a particular column, x, within said sensor is defined according to the following equation:

$$NORM(x) = AVERAGE\ IMAGE\ INTENSITY - AVERAGE\ COLUMN\ INTENSITY(x);$$

where:

NORM(x) is the image normalization coefficient for a particular column, x;

AVERAGE IMAGE INTENSITY is defined according to the following equation:

$$AVERAGE\ IMAGE\ INTENSITY = \frac{\sum_{col=0}^{x} \sum_{row=n}^{n'} IMAGE(col, row)}{(X+1) \times (n'-n+1)};$$

where X+1 is the total number of columns in said image sensor, and where n and n' are integers such that $0 \leq n < Y$ and $0 < n' \leq Y$ (where Y is the maximum row ordinate value in said image sensor), such that n'−n+1 represents the number of rows within each column from which individual column intensity is determined; and where AVERAGE COLUMN INTENSITY(x) is the average intensity for a particular column, x, within said image sensor and is defined by the following equation:

$$\text{AVERAGE COLUMN INTENSITY}(x) = \frac{\sum_{row=n}^{n'} \text{IMAGE}(x, row)}{(n' - n + 1)};$$

where n and n' are integers such that $0 \leq n < Y$ and $0 < n' \leq Y$ (where Y is the maximum row ordinate value in said image sensor), such that n'−n+1 represents the number of rows within each column from which average column intensity is determined.

16. The fingerprint scanning system of claim 9, wherein said at least one mobile, hand-held fingerprint scanner further comprises:

a normalization processor that, with said image normalization data, normalizes raw image data from said image sensor.

17. The remote fingerprint scanner of claim 1, wherein said fingerprint image data includes raw fingerprint image data.

18. The remote fingerprint scanner of claim 1, wherein said fingerprint image data includes normalized fingerprint image data.

19. The fingerprint scanning system of claim 9, wherein said data includes said image normalization data corresponding to said first remote fingerprint scanner and fingerprint image data.

20. The fingerprint scanning system of claim 19, wherein said fingerprint image data includes raw fingerprint image data.

21. The fingerprint scanning system of claim 19, wherein said fingerprint image data includes normalized fingerprint image data.

22. A fingerprint scanning system comprising:

a remote fingerprint scanner, said remote fingerprint scanner including:
an image sensor, and
image normalization data stored in a non-volatile memory, wherein said image normalization data is specific to the image sensor and is representative of image sensor sensitivity at a pixel level;

a docking station; and a host processor that receives at least one fingerprint image signal from said remote fingerprint scanner when said remote fingerprint scanner is detachably coupled to said docking station; and wherein said image sensor detects said at least one fingerprint image signal when said at least one remote fingerprint scanner is not coupled with said docking station.

23. The fingerprint scanning system of claim 22, wherein said at least one remote fingerprint scanner is a mobile, hand-held fingerprint scanner.

24. The fingerprint scanning system of claim 22, wherein said remote fingerprint scanner further includes a data communications interface that couples data between said remote fingerprint scanner and said docking station.

25. The fingerprint scanning system of claim 24, wherein said data communications interface is selected from the group consisting of a universal serial bus (USB) and an IEEE1394 compatible interface.

26. The remote fingerprint scanning system of claim 22, wherein said remote fingerprint scanner further comprises:

a camera board;
wherein said image sensor and said non-volatile memory are disposed on said camera board.

27. The remote fingerprint scanning system as in claim 22, wherein said image normalization data is representative of non-uniform sensitivity among pixels, rows of pixels, or columns of pixels within said image sensor.

28. The remote fingerprint scanner of claim 27, wherein said image normalization data is representative of non-uniform sensitivity among columns of pixels within said image sensor, said image normalization data comprising an image normalization coefficient for each column within said image sensor, wherein an image normalization coefficient for a particular column, x, within said sensor is defined according to the following equation:

NORM(x)=AVERAGE IMAGE INTENSITY−AVERAGE COLUMN INTENSITY(x);

where:

NORM(x) is the image normalization coefficient for a particular column, x;

AVERAGE IMAGE INTENSITY is defined according to the followings equation:

$$\text{AVERAGE IMAGE INTENSITY} = \frac{\sum_{col=0}^{x} \sum_{row=n}^{n'} \text{IMAGE}(col, row)}{(X + 1) \times (n' - n + 1)};$$

where X+1 is the total number of columns in said image sensor, and where n and n' are integers such that $0 \leq n < Y$ and $0 < n' \leq Y$ (where Y is the maximum row ordinate value in said image sensor), such that n'−n+1 represents the number of rows within each column from which individual column intensity is determined; and where AVERAGE COLUMN INTENSITY(x) is the average intensity for a particular column, x, within said image sensor and is defined by the following equation:

$$\text{AVERAGE COLUMN INTENSITY}(x) = \frac{\sum_{row=n}^{n'} \text{IMAGE}(x, row)}{(n' - n + 1)};$$

where n and n' are integers such that $0 \leq n < Y$ and $0 < n' \leq Y$ (where Y is the maximum row ordinate value in said image sensor), such that n'−n+1 represents the number of rows within each column from which average column intensity is determined.

29. A method for capturing at least one fingerprint using a remote fingerprint scanner comprising:

(A) detecting the at least one fingerprint with an image sensor of the remote fingerprint scanner;

(B) detachably coupling the remote fingerprint scanner with a docking station so that a host processor and the remote fingerprint scanner can communicate;

(C) transmitting image normalization data stored in a non-volatile memory of the remote fingerprint scanner to the host processor, wherein said image normalization data is specific to the image sensor and is representative of image sensor sensitivity at a pixel level; and (D) transmitting fingerprint image data corresponding to the detected at least one fingerprint image to the host processor.

30. The method of claim 29, further comprising:

(E) decoupling the remote fingerprint scanner and docking station.

31. The method of claim 29, wherein step (D) comprises:

transmitting raw fingerprint image data corresponding to the detected at least one fingerprint image to the host processor.

32. The method of claim 29, further comprising the step of:

normalizing raw fingerprint image data corresponding to the detected at least one fingerprint image using the stored image normalization data.

33. The method of claim 32, wherein step (D) comprises:

transmitting the normalized fingerprint image data corresponding to the detected at least one fingerprint image to the host processor.

34. A remote fingerprint scanner comprising:

an image sensor; and image normalization data stored in a non-volatile memory;

wherein said image normalization data is specific to said image sensor and is representative of non-uniform sensitivity among pixels, rows of pixels, or columns of pixels within said image sensor;

wherein said image normalization data is representative of non-uniform sensitivity among columns of pixels within said image sensor, said image normalization data comprising an image normalization coefficient for each column within said image sensor, wherein an image normalization coefficient for a particular column, x, within said sensor is defined according to the following equation:

NORM(x)=AVERAGE IMAGE INTENSITY−AVERAGE COLUMN INTENSITY(x);

where:

NORM(x) is the image normalization coefficient for a particular column, x;

AVERAGE IMAGE INTENSITY is defined according to the following equation:

$$\text{AVERAGE IMAGE INTENSITY} = \frac{\sum_{col=0}^{x} \sum_{row=n}^{n'} \text{IMAGE}(col, row)}{(X+1) \times (n'-n+1)};$$

where X+1 is the total number of columns in said image sensor, and where n and n' are integers such that $0 \leq n < Y$ and $0 < n' \leq Y$ (where Y is the maximum row ordinate value in said image sensor), such that n'−n+1 represents the number of rows within each column from which individual column intensity is determined; and where AVERAGE COLUMN INTENSITY(x) is the average intensity for a particular column, x, within said image sensor and is defined by the following equation:

$$\text{AVERAGE COLUMN INTENSITY}(x) = \frac{\sum_{row=n}^{n'} \text{IMAGE}(x, row)}{(n'-n+1)};$$

where n and n' are integers such that $0 \leq n < Y$ and $0 < n' \leq Y$ (where Y is the maximum row ordinate value in said image sensor), such that n'−n+1 represents the number of rows within each column from which average column intensity is determined.

35. A fingerprint scanning system comprising:

at least one remote fingerprint scanner, said at least one remote fingerprint scanner including:
an image sensor, and
image normalization data stored in a non-volatile memory; and at least one host processor that receives image signals from said at least one remote fingerprint scanner;

wherein said image normalization data is specific to said image sensor and is representative of non-uniform sensitivity among pixels, rows of pixels, or columns of pixels within said image sensor;

wherein said image normalization data is representative of non-uniform sensitivity among columns of pixels within said image sensor, said image normalization data comprising an image normalization coefficient for each column within said image sensor, wherein an image normalization coefficient for a particular column, x, within said sensor is defined according to the following equation:

NORM(x)=AVERAGE IMAGE INTENSITY−AVERAGE COLUMN INTENSITY(x);

where:

NORM(x) is the image normalization coefficient for a particular column, x;

AVERAGE IMAGE INTENSITY is defined according to the following equation:

$$\text{AVERAGE IMAGE INTENSITY} = \frac{\sum_{col=0}^{x} \sum_{row=n}^{n'} \text{IMAGE}(col, row)}{(X+1) \times (n'-n+1)};$$

where X+1 is the total number of columns in said image sensor, and where n and n' are integers such that $0 \leq n < Y$ and $0 < n' \leq Y$ (where Y is the maximum row ordinate value in said image sensor), such that n'−n+1 represents the number of rows within each column from which individual column intensity is determined; and where AVERAGE COLUMN INTENSITY(x) is the average intensity for a particular column, x, within said image sensor and is defined by the following equation:

$$\text{AVERAGE COLUMN INTENSITY}(x) = \frac{\sum_{row=n}^{n'} \text{IMAGE}(x, row)}{(n'-n+1)};$$

where n and n' are integers such that $0 \leq n < Y$ and $0 < n' \leq Y$ (where Y is the maximum row ordinate value in said image sensor), such that n'−n+1 represents the number of rows within each column from which average column intensity is determined.

36. A method of manufacturing a remote fingerprint scanner having local storage of image normalization data comprising the steps of:

(a) exciting an image sensor with a light source;

(b) determining a set of normalization coefficients; and (c) storing said normalization coefficients in a non-volatile memory, said non-volatile memory disposed locally with said image sensor;

wherein step (b) includes comparing an average column intensity for each column to an average image intensity, said comparison resulting in a normalization coefficient for each column.

37. The method of claim 36, wherein said comparison is performed according to the following equation:

NORM(x)=AVERAGE IMAGE INTENSITY−AVERAGE COLUMN INTENSITY(x);

where:

NORM(x) is the image normalization coefficient for a particular column, x;

AVERAGE IMAGE INTENSITY is determined as expressed in the following equation:

$$\text{AVERAGE IMAGE INTENSITY} = \frac{\sum_{col=0}^{x} \sum_{row=n}^{n'} \text{IMAGE(col, row)}}{(X+1) \times (n'-n+1)};$$

where X+1 is the total number of columns in said image sensor, and where n and n' are integers such that $0 \leq n < Y$ and $0 < n' \leq Y$ (where Y is the maximum row ordinate value in said image sensor), such that n'−n+1 represents the number of rows within each column from which individual column intensity is determined; and AVERAGE COLUMN INTENSITY(x) is the average intensity for a particular column and is determined as expressed in the following equation:

$$\text{AVERAGE COLUMN INTENSITY}(x) = \frac{\sum_{row=n}^{n'} \text{IMAGE}(x, \text{row})}{(n'-n+1)};$$

where n and n' are integers such that $0 \leq n < Y$ and $0 < n' \leq Y$ (where Y is the maximum row ordinate value in said image sensor), such that n'−n+1 represents the number of rows within each column from which average column intensity is determined.

* * * * *